United States Patent
Hagen et al.

(10) Patent No.: US 11,522,432 B2
(45) Date of Patent: Dec. 6, 2022

(54) METHODS AND APPARATUS FOR LINEAR ELECTRIC MACHINE

(71) Applicant: IRIS DYNAMICS LTD, Victoria (CA)

(72) Inventors: Kyle A. Hagen, Victoria (CA); Patrick A. McFadden, Victoria (CA); Maximilien F. Bethune-Waddell, Victoria (CA); Jeffrey R. Rendell, Victoria (CA)

(73) Assignee: IRIS DYNAMICS LTD, Victoria (CA)

( * ) Notice: Subject to any disclaimer, the term of this patent is extended or adjusted under 35 U.S.C. 154(b) by 583 days.

(21) Appl. No.: 16/759,627

(22) PCT Filed: Feb. 20, 2018

(86) PCT No.: PCT/CA2018/050192
§ 371 (c)(1),
(2) Date: Apr. 27, 2020

(87) PCT Pub. No.: WO2018/148850
PCT Pub. Date: Aug. 23, 2018

(65) Prior Publication Data
US 2021/0408887 A1   Dec. 30, 2021

Related U.S. Application Data

(60) Provisional application No. 62/461,150, filed on Feb. 20, 2017.

(51) Int. Cl.
*H02K 21/22* (2006.01)
*H02K 41/03* (2006.01)
(Continued)

(52) U.S. Cl.
CPC ......... *H02K 41/031* (2013.01); *H02K 11/215* (2016.01); *H02P 6/006* (2013.01); *H02P 6/16* (2013.01); *H02P 25/064* (2016.02)

(58) Field of Classification Search
CPC .. H02K 41/031; H02K 11/215; H02K 21/227; H02P 25/064; H02P 6/006; H02P 6/16
See application file for complete search history.

(56) References Cited

U.S. PATENT DOCUMENTS

2008/0197739 A1* 8/2008 Nashiki ............... H02K 21/227
                                                310/156.55
2011/0175462 A1* 7/2011 Boletis ............... H02K 41/0356
                                                310/12.19

(Continued)

OTHER PUBLICATIONS

Frieder Schuller et al.: "Position Control of a Linear Transverse Flux Machine with Subordinate Current Control"—2014 International Conference on Electrical Machines (ICEM), pp. 629-633 https://ieeexplore.ieee.org/stamp/stampjsp?arnumber=6960246 See Section B, Section IV, Figs. 3, 6, 7.

(Continued)

*Primary Examiner* — Cortez M Cook
(74) *Attorney, Agent, or Firm* — Hamre, Schumann, Mueller & Larson, P.C.

(57) ABSTRACT

An embodiment of a linear electric machine includes two or more phases that define a central bore, and alternating permanent magnets that are disposed within the central bore and are free to move relative the windings. An embodiment of a method for selectively powering the windings is disclosed that enables the machine to realize a commanded force, or to determine the force present by using the current within the windings and the alignment of the magnets relative to the windings.

14 Claims, 12 Drawing Sheets

(51) Int. Cl.
    *H02K 11/215*     (2016.01)
    *H02P 25/064*     (2016.01)
    *H02P 6/00*     (2016.01)
    *H02P 6/16*     (2016.01)

(56) References Cited

U.S. PATENT DOCUMENTS

| | | | |
|---|---|---|---|
| 2015/0115848 A1 | 4/2015 | McFadden | |
| 2015/0171674 A1* | 6/2015 | Lee | H02P 25/22 |
| | | | 310/46 |
| 2015/0318772 A1* | 11/2015 | Jahshan | B60L 50/51 |
| | | | 318/400.41 |

OTHER PUBLICATIONS

Oliver Winter et al.: "Design study of magnet shapes for axial Halbach arrays using 3D Finite Element Analyses"—2012 International Conference on Electrical Machines, pp. 2660-2665 https://pdfs.semanticscholar.org/e8a3/ec34e6O3448026f8d9-3a2806a596802aafa.pdf.

International Search Report and Written Opinion issued for PCT/CA2018/050192, dated May 1, 2018, 10 pages.

* cited by examiner

METHODS AND APPARATUS FOR LINEAR ELECTRIC MACHINE

CROSS-REFERENCES TO RELATED APPLICATIONS

This application claims priority to U.S. Provisional Application Ser. No. 62/461,150 titled "HEMISPHERICAL LINEAR RESPONSE ACTUATOR," filed on Feb. 20, 2017, and which is incorporated in its entirety herein by reference.

TECHNICAL FIELD

An embodiment relates to the field of Linear Electric Machines (LEMs) and more specifically: those machines that are commutated to produce forces over an arbitrary range of motion; those machines that accurately predict and control their force outputs; and those machines that utilize position feedback.

SUMMARY

For linear positioning or generating linear forces, a traditional rotary electric motor typically is coupled to a screw drive. The motor can be of any technology, be it brushless or brushed, and can include two or more phases. The coupled screw drive is spun by the motor, and a nut or other threaded mechanism moves up and down the screw drive, producing linear motion and linear force.

Some approaches include coaxial electrical windings and permanent magnets. These approaches generate forces through magnetic interaction alone, without relying on a mechanical connection to transform rotary motion into linear force and motion. Motors including a single coaxial winding and permanent magnet are often called voice-coil actuators, and operate in a similar manner to an audio speaker. These devices typically accelerate faster than screw-drive systems, but have characteristically short maximum-travel lengths.

The range limitations of single-winding motors can be addressed by adding multiple phases and commutating their electrical fields similar to brushless rotary motors. When these motors are intended to be stalled or forced to move in some way, position information is required to perform that commutation. Typically, these motors employ alternating permanent magnet arrays that are held together mechanically. If the permanent magnets in the array are spaced closely together—as they typically are—the resulting force required to keep them from separating is high, and special construction methods are required. Also, when alternating magnets are forced together, the resulting total magnetic field in between magnets changes directions and magnitude sharply, as shown in FIG. 4B when taken in contrast to FIG. 3B. This sharp change in magnetic-field magnitude and direction make it difficult to commutate the motor such that the force output is constant as the magnet array moves relative to the windings; the force ripple typical of these devices is sometimes referred to as "cogging" and largely degrades the motors applicability in many applications.

When the force output of any linear motor is important for a motor application, a force-sensor of some technology is typically included. The force sensor is often a strain gauge that generates a sense signal that is amplified to produce a measurable voltage, the magnitude of which depends on the amount of force between the linear motor and its load. A feedback signal equal to, or derived from, the sense signal is fed back into the system controlling the motor, and the motor is controlled to achieve the desired force levels. Generating rapid, controllable forces over a wide range of linear positions, without mechanical impedance when unpowered or powered, and with a smooth and linear force output across the range of travel, has long been a complicated and unsolved problem.

Existing technologies employing mechanical couplings fail to deliver anything but low-frequency forces, and exhibit a significant amount of inherent mechanical impedance when unpowered. These technologies also suffer from mechanical wear, especially when the output shaft is dynamically acted on by the load. In at least most cases, a load attached to a shaft of this technology experiences a nonlinear-force-response characteristic of the rotary motor generating the forces and the screw drive coupling the load to the motor. In the instances where the force response is actively controlled using a force sensor and closed-loop control, the system complexity and cost is increased significantly, both in manufacture and in maintenance.

Existing technologies employing coaxial windings and closely spaced permanent magnets have rapidly changing magnetic fields and are not currently controlled to produce a smooth and linear output force, except when a force sensor and a closed feedback loop is employed—again increasing the system cost and complexity.

Therefore, an embodiment solves one or more of the above-discussed problems by combining physical geometries of motor windings and permanent magnets with characterization and commutation techniques. An embodiment allows for construction of a linear electrical machine (LEM) that applies forces through magnetic interaction alone, delivers a smooth and linear force response without requiring a force sensor, effectively converts mechanical energy to electrical energy, and effectively converts electrical energy to mechanical energy.

The engineer designing a solution while employing an embodiment disclosed herein will be enabled to control forces rapidly and precisely while maintaining a bill-of-materials cost and total system complexity significantly lower than he or she would have while employing previously-existing technology.

DETAILED DESCRIPTION

Conventions

The term 'current' is used exclusively to represent electrical current.

The term 'field' is used exclusively to represent a magnetic field.

The term 'shaft position' is used herein to describe the relative position between the shaft and winding pack (both of these elements are discussed later) in a pack-shaft pair (also discussed later). 'Shaft speed' follows from shaft position in that it describes relative speed between the winding pack and the shaft. All descriptions of position and motion are taken to be relative; it is understood that the shaft, the winding pack, or both may be changing position and motion with respect to a load or user. A load or user is meant to imply, but not to limit, use of an embodiment for those applications involving applied motion, or those applications involving applied force: such applications including robotic manipulators, production-line manipulators, programmable spring-mass-damper emulators, haptic or emulated-link human-machine controls, wave generators (including, but not limited to, waves in sound or water), platform stabilization, and platform motion control.

The term 'function' is used exclusively to represent some quantity (e.g., of axial forces, magnetic fields, force-per-amp, or amps-per-force) represented by the y-axis, at a number of positions along a spatial dimension represented by the x-axis. While the figures resemble time-based oscillating functions, it is important to observe that these functions oscillate over a spatial dimension—typically over shaft position. For ease of description, some functions will be described as sinusoid-like. In this context, a function described as such shares six characteristics with the sine function: it is continuous; it is periodic; its integral over a period is zero; it contains exactly two peak magnitudes of equal and opposite polarity, spaced on the x-axis one-half-period apart and each one-quarter-period apart from a zero-crossing; it contains exactly two zero-crossings, spaced on the x-axis one-half-period apart and each one-quarter-period apart from both peak magnitudes' x-axis location; and when translated so that said function crosses the origin (like a sine function does), said function becomes an odd function, meaning its left-hand-plane is a reflection of the right-hand-plane about both the x-axis and y-axis. All figures depicting functions herein represent sinusoid-like functions.

The concept of 'function smoothness' is discussed throughout the document. In this context, two functions' smoothness relative to one another can be objectively compared by normalizing the functions according to their maximum magnitudes and finding their derivatives at all positions; the function with lowest maximum derivative magnitude is said to be smoother. A function's smoothness is said to be improved if it is changed such that its maximum derivative is reduced—even if in doing so, the average derivative is increased.

Figure 8:
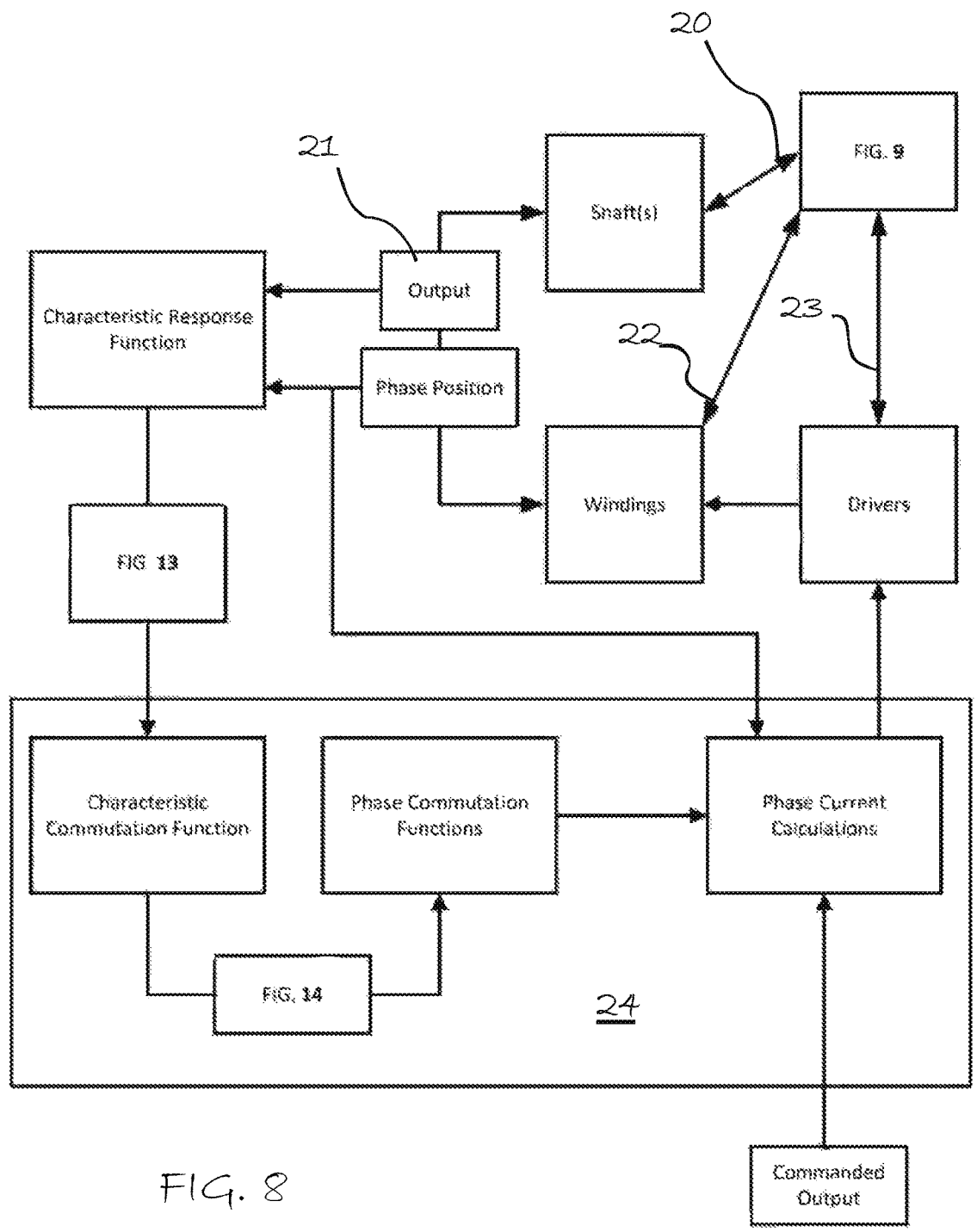
FIG. 8 s a flow diagram depicting the physical components of an embodiment, the relationships used in the design of those components, and at least one method by which the components are controlled to achieve advantageous effect—according to an embodiment.

The 'output' of a device is considered to be a force, or a force function (i.e. a curve representing force outputs at a variety of positions) depending on the context. This output is depicted as element 21 on flow chart FIG. 8. While significant discussion occurs surrounding the forces generated, it is recognized that a useful output of an embodiment of the machine described can be the electrical energy converted from mechanical energy when the shaft position changes.

The term 'commanded output' is used to imply some other system is communicating with an embodiment, but is not meant to limit or imply the nature of said system. The term "commanded output" is understood to represent the desired forces generated between the shaft and windings of an embodiment. The commanded output is often discussed as being constant (i.e. not changing over time), but it is understood that at least most applications will involve commanded outputs that change over time.

The term 'commutation' is used herein to describe selectively powering the phases of an electrical machine to achieve the commanded output. While commutation traditionally aims to achieve a commanded speed, commutation discussed herein aims to achieve a commanded force. It is important to note that commutation in the latter sense does not necessarily result in time-varying currents in the phases;

commutation methods discussed herein involve transforming the position of an embodiment and the commanded output into the currents for the phases.

The term 'linear force output' or 'linear output' might have three different meanings to someone skilled in the art. Linear output might describe the direction in which force is applied and could be used in comparison to a rotational force output (torque). A linear force output might describe the ability of an embodiment to respond linearly to a user command (i.e. realizing twice-as-much output in response to twice-as-much input). A linear output can be used to describe the shape of the output function; for example, if an embodiment with a perfectly linear output was subject to a constant user command, the embodiment's output would not change if the shaft position were changed. The latter interpretation should be taken herein; when describing the second interpretation, the term 'linearly proportional to' is used instead.

The term 'output ripple' is used herein to describe the departure of an output function from a linear output. For example, consider an embodiment that was said to exhibit output ripple noticeable to a human; a human moving said embodiment with said embodiment being subject to a constant commanded force, would detect variations in the force output as the embodiment's shaft position was varied; output ripples in electric machine is often referred to as "cogging."

The concept of 'linearity' as in 'output linearity' is used to compare the output of an embodiment to a 'perfectly linear' output (i.e. a function having: a perfectly flat curve; the same value for every position; a derivative of zero at all points). Electric machines claiming a high level of linearity are often referred to as "cog-less."

Phase Winding Description

Windings of some electrically-conducting medium, surrounded by an electrically-isolating layer, are used to generate controllable fields. The term 'windings' implies one or more turns of the medium. These turns can be wound beside each other and on top of one another and form a quasi-circular (i.e., spiral) path for electrical charge to flow within, starting at the beginning of the first turn (hereafter referred to as the 'positive lead'), and ending at the termination of the last turn (hereafter referred to as the 'negative lead'). Windings define a central bore and a central axis about which the turns occur, and an axial length referred to as the 'winding length.' Windings typically, and ideally, have an even spatial distribution of turns throughout their volume, although manufacturing processes may cause slight variances in this distribution. All turns in a winding occur in the same rotational direction. When current is passed through the winding, a field is generated that is linearly proportional to that current.

Windings are typically copper surrounded by some bonding agent with high dielectric strength. Windings are typically constructed on a winding machine. The diameter of wire used to construct the windings is dependent on the desired performance characteristics of the machine, and depends on the operational voltage and other factors. The dielectric casing of the wire is typically a bondable agent that will soften and adhere to itself upon heating; as part of the manufacturing process, windings are heated so as to form a solid part (i.e., the wires "stuck" together) when cooled.

Figure 1:
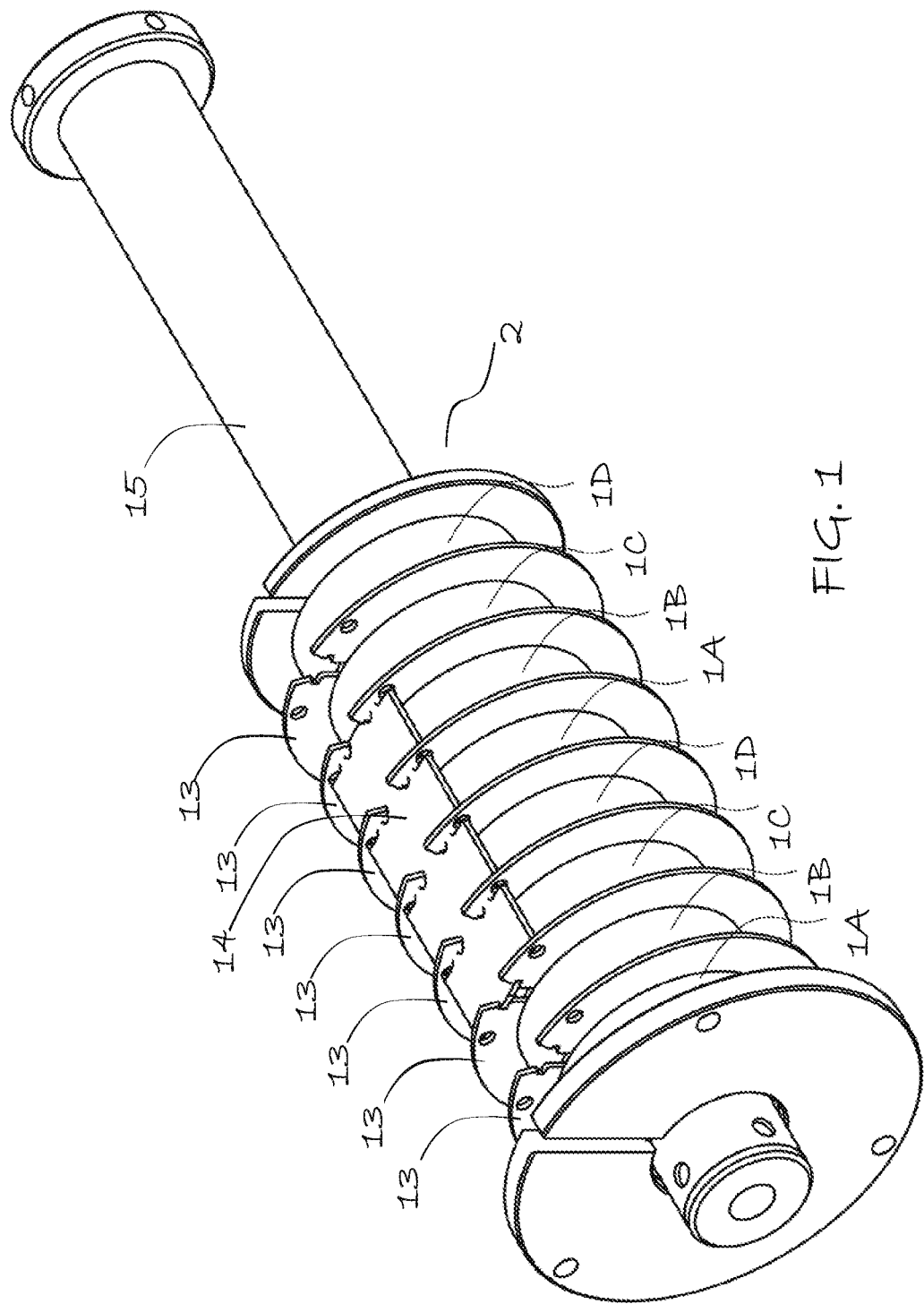
FIG. 1 is an isometric view of a four-phase, eight-winding LEM, according to an embodiment.
Figure 10A:
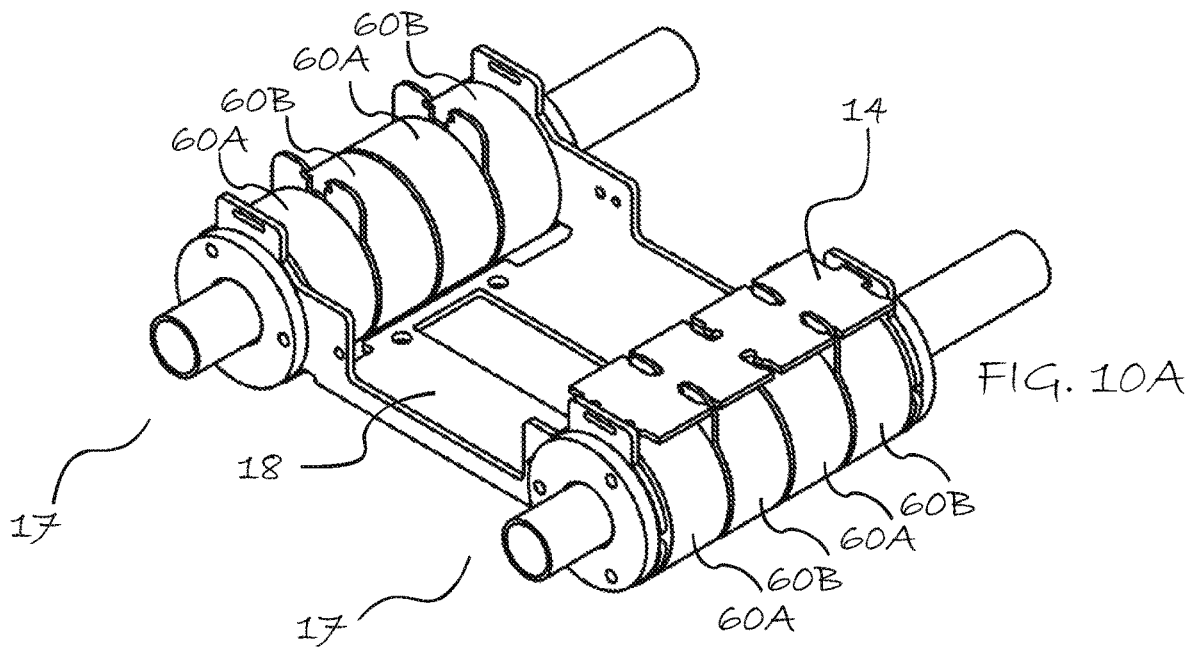
FIG. 10A is an isometric of an example two-phase, two-shaft-by-four-winding LEM—according to an embodiment.

Windings are combined to form a linear array of windings, referred to as a winding pack. The winding pack includes windings that share a common central axis and a central bore capable of receiving a shaft. FIG. 1 illustrates a four-phase, eight-winding winding pack (2), and FIG. 10A illustrate two, two-phase, four-winding winding packs (17). A combination of a winding pack and a shaft that is received within the winding pack is herein referred to as a pack-shaft pair.

All windings within a winding pack are typically constructed with a similar number of turns and with similar geometry such that all of the windings are configured to generate a similar magnetic field when a same current is passed through them. Each phase within a winding pack typically contains the same number of windings as all other phases in the same winding pack. When any two phases within a winding pack contain less or more windings than another phase, the commutation for those phases is scaled appropriately.

It is sometimes advantageous to include a spacing material between windings within a winding pack; when such a construction method is used, winding length equals the winding period less the thickness of the spacing material. The presence of the spacing material can be used to provide a low thermal-resistance path for heat to travel out of the windings and into heat spreaders or heat sinks such as a chassis, fins, or a liquid chamber. The spacers can facilitate easier lead routing from the windings to the drivers. Spacers can mount sensors, drivers, or other electronics. FIG. 1 illustrates spacers (13), which include wire-grooming and position-sensor mounting features. FIG. 10A illustrates the use of spacers in a similar manner, but without wire grooming features. For compact designs, winding spacers can include the electronic circuits of the windings driver, the phase position sensor, temperature sensors, or other electronics. When an electrically conductive spacing material is included between windings, it is typically advantageous to include a split, so that electric currents cannot travel in a complete circle around the shaft; this split prevents currents from being induced in the spacer as the shaft is moved within it. If currents are allowed to flow through a spacer in response to shaft motion, forces will develop in response to shaft motion as a result of the magnetic fields induced from said current.

A winding pack's central bore can be configured to receive a central tube that is fixed to the inner dimension of the windings and/or any spacing material used; this central tube is used as a sliding interface for a shaft, or can be fitted with bushings which act as a sliding interface. This central tube can be configured to exhibit a high thermal resistance to protect the shaft from the heat of the windings. Some plastics or carbon-fiber materials are suitable material for the winding pack's central tube.

Figure 2A:
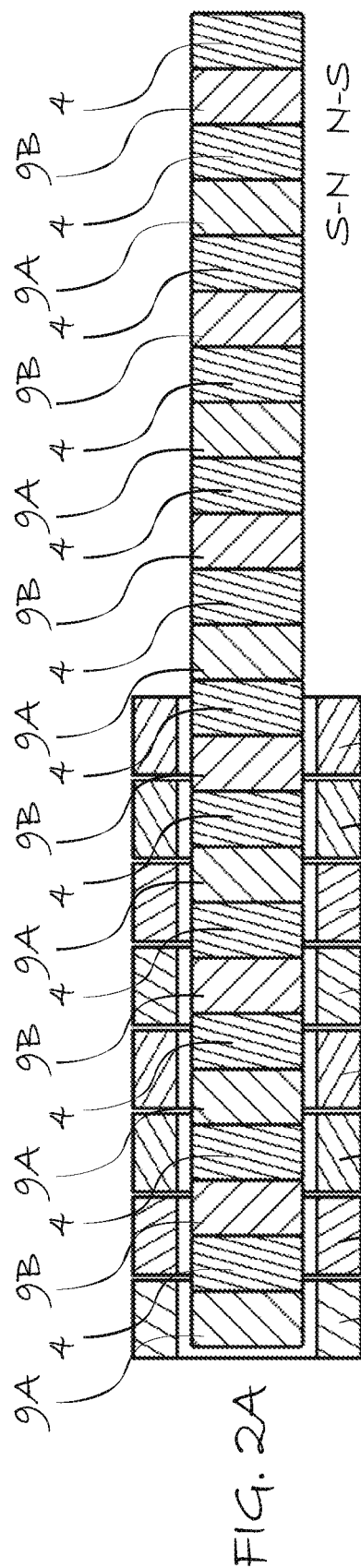
FIG. 2A is a sectional drawing of the LEM of FIG. 1 at 'position 0' according to an embodiment. The N-S and S-N labels are intended to demonstrate the polarity of all of the pairs of adjacent permanent magnets 9A and 9B.
Figure 2B:
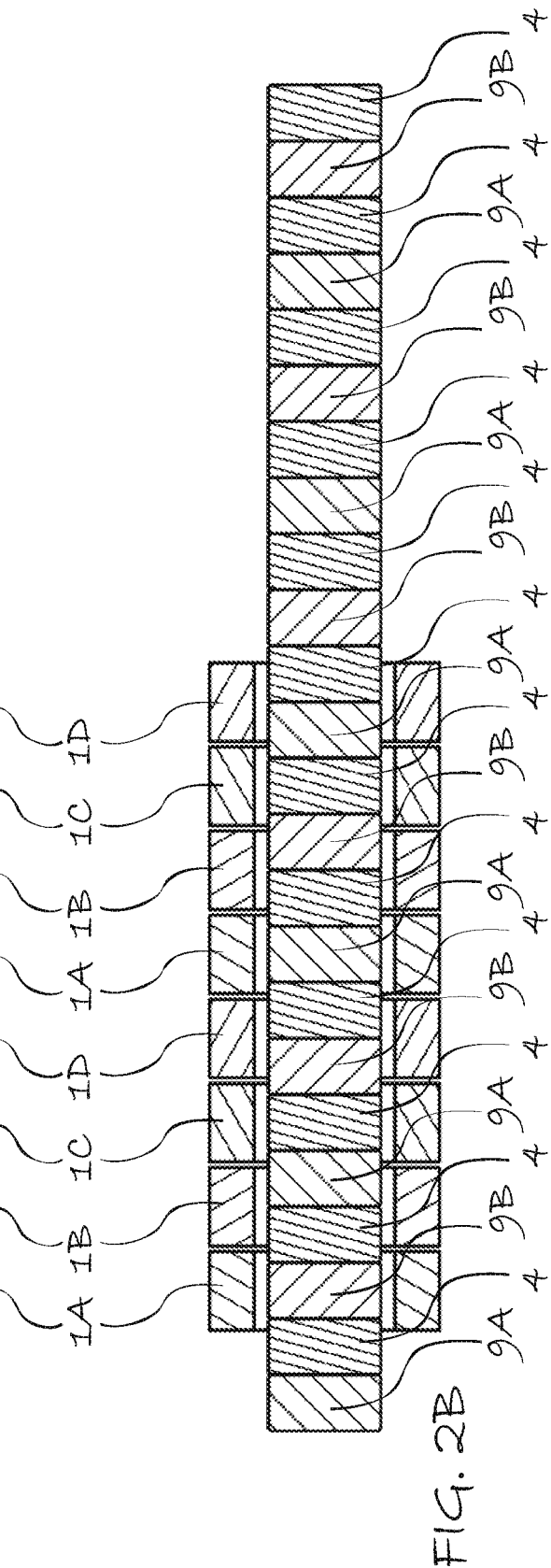
FIG. 2B is a sectional drawing of the same LEM of FIG. 2A moved to 'position π', according to an embodiment.

Windings are organized into phases; a phase refers to a winding, or a group of windings, that can receive electrical power from a single source. A phase can consist of several windings connected in series, several windings connected in parallel, or any combination of parallel and series connections. FIGS. 1, 2A, and 2B illustrate a winding pack comprising eight windings organized into four phases (1A through 1D). FIG. 10A illustrates two winding packs each including four windings each and organized into two phases 60A and 60B.

When phases include windings connected in series, the overall amount of wiring to the driver will be reduced. However, like the size of wire used in the windings, the connection of windings to produce a phase in either series, parallel, or a combination of series and parallel depends on the operational voltage and other parameters of the embodiment.

Shaft Description

A shaft is configured to be received within each winding pack's central bore and configured to have permanent magnetic fields. The term 'shaft' used herein describe the components that move relative to a winding pack, including but not limited to, permanent magnets, spacing material between those magnets, a container to house said magnets and spacing material, and any other components permanently affixed to this assembly, possibly including a load, a user manipulator, or a mechanical ground.

A shaft's fields are considered permanent in that they are not altered by normal operation of an embodiment and move instantly with the shaft through space. Permanent fields are normally generated by a combination of permanent magnets and iron, but could be generated by electromagnets or by other methods.

FIG. 1 shows an example of a shaft received by winding pack 2. While this shaft includes a sleeve (15) for magnets and iron, a sleeve or other container is not necessary. The alternating magnets typically included in a shaft would normally fly apart due to strong and opposing magnetic fields so a shaft sleeve can be included to hold them together. The contents of an embodiment's shaft are shown in the sectional views of FIGS. 2A and 2B; permanent magnets of alternating polarities 9A and 9B are separated by iron slugs 4 and together form a total magnetic field that moves through space with the shaft.

Figure 3A:
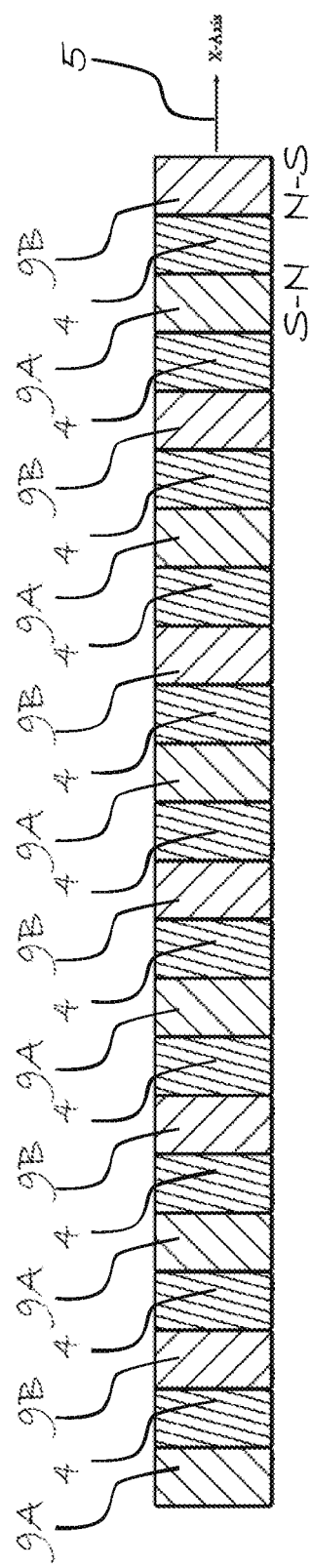
FIG. 3A is a cross sectional view of a shaft constructed of permanent magnets (9A and 9B) and iron spacing material (4)—according to an embodiment. Magnets having parallel hashmarks are understood to have similar polarities, denoted by N-S or S-N.
Figure 3B:
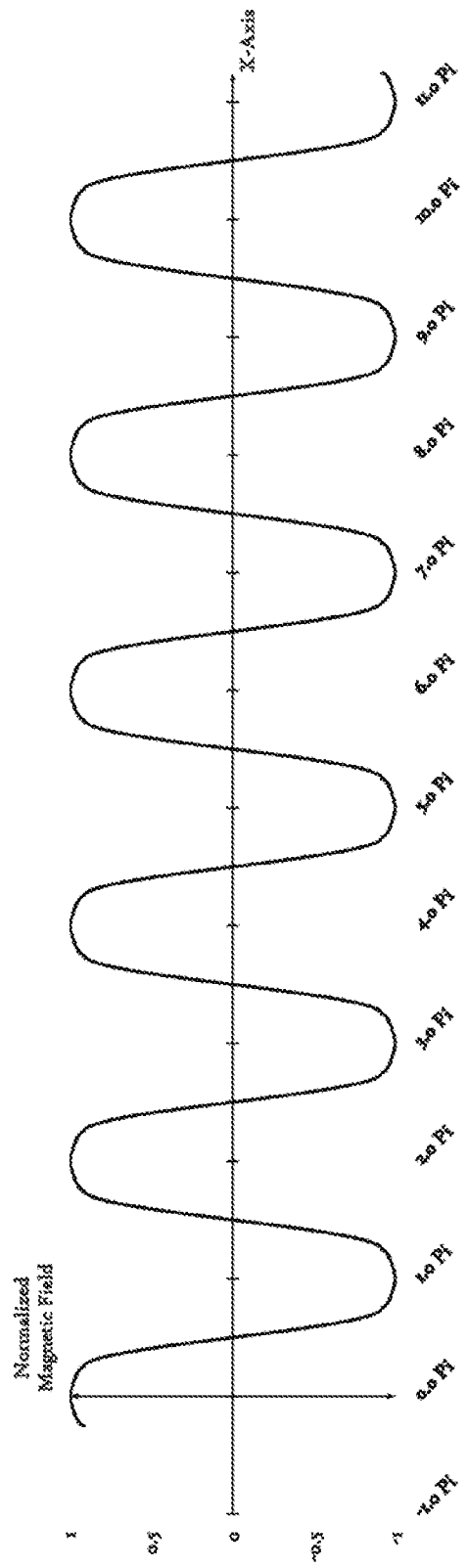
FIG. 3B is an example of the field function according to the shaft shown in FIG. 3A which represents the direction and normalized magnitude of the magnetic fields of said shaft along its central axis (5). This graph is scaled such that it aligns horizontally with FIG. 3A.

It is convenient to consider a single dimension along the center axis of the shaft on which the shaft's fields can be expressed; FIG. 3A includes an illustration of said axis (5) on an embodiment. Typically, all of the magnetic fields along this dimension are directed parallel, or approximately parallel, to the axis 5. The function created by plotting the axial field components versus axial position along this dimension is referred to as the shaft field function; an example of such a function with magnitudes normalized to one is shown in FIG. 3B. Typically, the shaft field function is a sinusoid-like function, as described above. The spatial period of the shaft field function is referred to as the shaft period, and relates to an axial distance over which the shaft field function repeats. The example of FIG. 3B is said to have a shaft period of a given the units of measurement of the x-axis (5). While the shaft period is here described in radians, it is understood that this value corresponds to an axial distance; when alternating magnets are used to generate the shaft fields, the shaft period is equal to twice the magnet-to-magnet spacing.

Figure 10B:
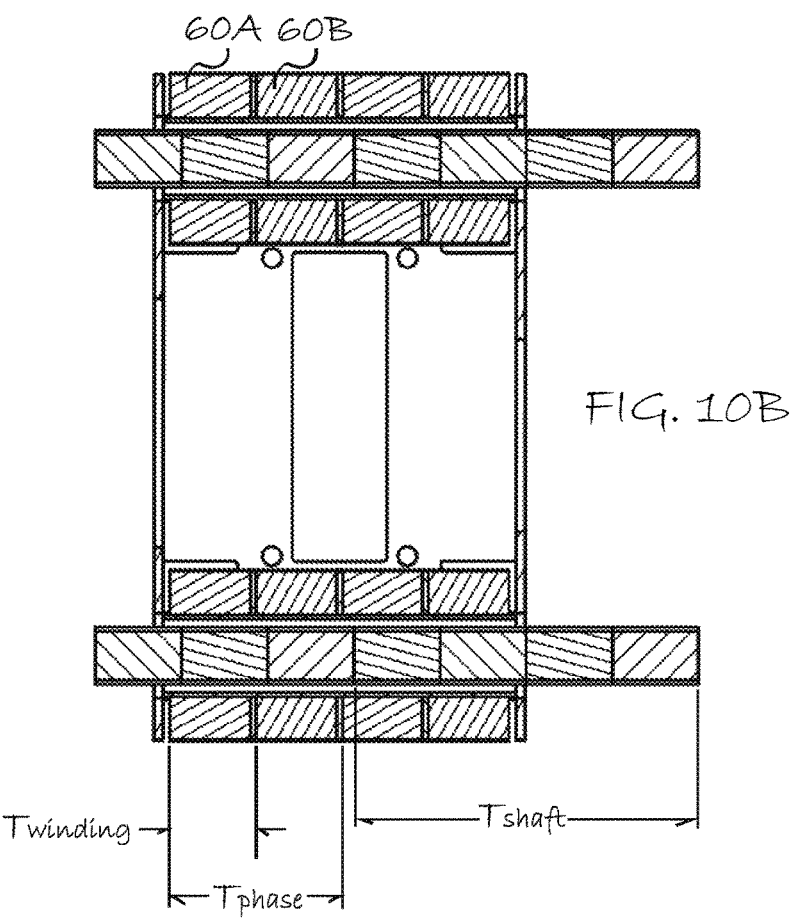
FIG. 10B is a sectional view of the LEM of FIG. 10A, illustrating the shaft period ($T_{shaft}$), winding period ($T_{winding}$), and phase spatial period ($T_{phase}$)—according to an embodiment.

One way a shaft can be constructed with an appropriate shaft field function is by locating permanent magnets at a fixed interval and by alternating their polarities. These magnets are polarized such that their north and south poles form a line that is parallel to the axis of the shaft. FIGS. 2A, 2B, and 10B show cross sections of respective shafts constructed of magnets having north-facing-right polarity (9A) and magnets having north-facing-left polarity (9B) separated by low-carbon iron (4). These magnets can be sized and located such that they physically touch one another, or such that a spacing medium (4) can be used in between them. The resulting shaft period when constructing a shaft in this manner is equal to the twice the fixed interval of the alternating magnets due to the alternating field vectors.

Neodymium permanent magnets are suitable for embodiments herein because of their high-density of magnetic fields. When these magnets are chosen not to occupy the full volume of the shaft—typically due to the advantages that having spaced magnets brings—high-permeability iron, like 'soft iron' or low-carbon iron provides good cost-to-performance results. The optimal ratio of neodymium to iron in an embodiment will depend on the windings' construction, the strength of the permanent magnets, and the desired performance of the embodiment.

A thin shaft sleeve made of a material with high thermal resistance and low friction is a suitable method of encapsulating the magnets and iron; examples of this material are a carbon fiber or plastic depending on the bushings in which they will travel. This sleeve is often a metal like aluminum or stainless steel due to the extra rigidity it provides. This shaft sleeve is not necessary when an embodiment travels on some other linear guide mechanism, but can prove useful in deflecting heat from the windings away from the magnets and further prove useful in ensuring the magnets stay aligned and in place. Thermal protection of the shaft is important in embodiments using permanent magnets to generate the shaft fields, because these materials can only operate below certain temperatures (commonly referred to as the Currie temperature) without permanently (and negatively) altering the magnetic field they generate. Since an unavoidable byproduct of current though a device's windings is heat generated (through resistive power losses), winding temperature must be allowed to rise during operation. A good thermal barrier, or multiple thermal barriers between the windings and shaft allow higher winding temperatures during operating. This is advantageous as the amount of power dissipated by a heat spreader or absorbed by a heat sink is proportional to the temperature of said spreader or sink; a device that can dissipate more heat (i.e. sustain hotter windings) can support higher duty-cycles or sustained operations.

Manufacturing or material non-ideologies may produce variances between shaft periods without a noticeable effect on performance. In this context, variance between any two shaft periods can be calculated by comparing the shaft field values of the two periods at every measurable phase angle within those periods; the maximum variance between these two periods is said to be the greatest difference of any two values compared this way; the maximum variance of a shaft is said to be the greatest maximum variance between any two periods within the shaft. The tolerance required between periods of the shaft field function will be a function of the desired output linearity. Two examples follow. The embodiment depicted in FIGS. 1, 2A and 2B is intended to interact with a human. This embodiment can output 202 newtons, and has a maximum shaft variance of six-percent of the commanded output, for any commanded output; this leads to a variation in output of six-percent across the embodiment's travel, but ultimately this is not detectable to the human operator. If another embodiment intended for remotely controlling surgery implements specifies outputs within one-half-a-percent of the command output, it will warrant (among other things) that greater controls in material selection and manufacturing to ensure the shaft field function varies by less than one-half-a-percent between any two periods.

Positions and Alignment Description

It is convenient to consider the relative position of the shaft field function with respect to the center of a winding; this is referred to as the 'phase position' of that winding. Because of the periodic nature of the shaft field function, the phase position is also periodic. The phase position can be used to represent positions along the central axis within a single shaft period. When phase positions are described herein they are expressed in radians as values ranging from 0 to 2n. The phase position of a winding is said to be zero if the at the center of the winding, the shaft field function is at its positive peak value. Phase A (1A) of FIG. 2B is said to be at phase position zero. The phase position changes when the shaft and winding pack move relative to one another. FIG. 2A illustrates Phase A (1A) at phase position $\pi$, Phase B (1B) at phase position $7\pi/4$, Phase C (1C) at phase position $\pi/2$, and Phase D (1D) at phase position $5\pi/4$. FIG. 2B illustrates Phase A (1A) at phase position zero, Phase B (1B) at phase position $3\pi/4$, Phase C (1C) at phase position $3\pi/2$, and Phase D (1D) at phase position $\pi/4$. Note that each phase in this example four-phase embodiment is separated by a phase position of $3\pi/8$ which can be calculated by Equation 1; the importance of this phase-angle relationship is further explained later.

The phase position of any two windings will differ from each other according to their distance from each other along the linear array of windings included in a winding pack. The phase position difference between adjacent windings, or between the first and last winding in a winding pack, can be calculated using Equation 3.

FIG. 2A is an example one extreme shaft position; if the shaft were to move further to the right, the linearity of the device would begin to rapidly degrade. The same is true for shaft movement to the left when the rightmost magnet is center aligned to the rightmost winding.

In some embodiments, even the extreme positions described above may result in excess output ripple near these extreme positions. This is usually negligible, as typical commutation dictates that the outer most coil is not receiving power in this condition. However, when an embodiment's output suffers from an unacceptable reduction in linearity at the discussed extreme positions (usually when the magnet length is relatively short when compared to the shaft period), more magnetic material can be added to the shaft; in other words, the extreme position can be moved out by some amount (e.g. by a quarter-shaft-period) to restore the required linearity.

The following method is used herein to represent shaft position: a shaft position of zero indicates that the shaft is at one extreme position, and shaft position is represented by radians where a distance of a corresponds to a distance of one shaft period. An example of shaft position zero is shown in FIG. 2A. Shaft position will equal a after the shaft (or winding pack) has moved one shaft period away from position zero. FIG. 2B is said to be at position $\pi$, as it has moved one-half period from position zero.

The maximum shaft position is a function of the number of shaft periods within the shaft, the number of windings within the winding pack receiving the shaft, and the definition used for the extreme shaft positions. If the first proposed method of defining extreme positions is used, the embodiment represented by FIGS. 2A and 2B is said to have a maximum shaft position of $11\pi/2$ while the embodiment represented by FIG. 10B can be said to have a maximum shaft position of $3\pi/2$.

Parallel Geometries Description

Embodiments include at least one pack-shaft pair. Embodiments including two or more pack-shaft pairs typically: share the same number of phases; individually satisfy the relationships of Equation 2; and include shafts that have the same number of periods in their shaft field function as shafts included in all other pairs.

For a given embodiment having more than one pack-shaft pair, a mechanical link is typically between all shafts and another mechanical link is between all winding packs. Pairs included in an embodiment can have different dimensions from one another; for example, one pack-shaft pair could have a winding period that was half the winding period of another pack-shaft pair, so long as the shaft period of the former pack-shaft pair was half that of the latter. This scale factor between pack-shaft pairs is important when considering how the shafts and winding packs of an embodiment are mechanically linked. These mechanical links are such that any relative motion experienced by one shaft-winding pack pair is also experienced, at a scaled amount, by all other shaft-winding pack pairs. This scaled value between any two pack-shaft pairs is, ideally, identical to the ratio of shaft periods, or equivalently the ratio of the winding periods, between the shafts or between the winding packs included in the pair respectively. FIGS. 10A and 10B show one embodiment having multiple two-phase pack-shaft pairs (17); note that the mechanical link between the shafts is not illustrated, and since the dimensions for both packs are equal, the mechanical link (15) between the winding packs is one-to-one (rigid) ratio. The mechanical links are typically formed such that when one pack-shaft pair is at an extreme position, so too are all other shaft-pack pairs.

When shafts are mechanically linked in the manner described above, and winding packs are also mechanically linked in the manner described above, the phase position of all phases will be equal for all pack-shaft pairs, regardless of any (scaled) differences in their construction; it follows then that phase position (which is related to an axial position) measures different distances for any two pack-shaft pairs of differing shaft periods.

Cross-Sectional Relationships

Typically, the windings form a hollow circular cross section on a plane perpendicular to the central axis, and the shaft (including all magnetic material used) forms a solid circular cross section on that same plane. Windings configured to form a hollow circle cross section may receive a shaft forming a smaller hollow circular cross section; such a hollow shaft could receive wires, pipes, sensors or other things. Other cross-sectional shapes can be used. For example, windings may form a hollow square cross section, and receive a shaft that forms a solid square cross section. Such a configuration would prevent the shaft from rotating freely within the winding pack.

Axial Relationships

The axial spacing of windings within a pack is referred to as the winding spatial period, or simply as 'winding period.' FIG. 10B illustrates the distinctions between winding period (Twinding), phase spatial period (Tphase), and shaft period (Tshaft) for a two-phase embodiment. Windings within a winding pack may be touching one another, or may be spaced apart (the winding length can be equal to or less than the winding period); in any case windings are typically rigidly secured together.

When any phase in a winding pack includes multiple windings, these windings are spaced at fixed axial intervals known as the phase spatial period or simply as the phase period; the phase period is equal to the winding period times the number of phases.

When phase position is represented in radians, multiples of a can be subtracted from a winding's phase position. Equation 3 can be used to show that: if an embodiment includes an even number of phases, windings that are separated by an odd integer multiple of the phase period will have phase positions differing by 7C, while windings separated by even integer multiples of the phase spatial period will not differ in phase position; and if an embodiment includes an odd number of phases, every winding within a phase shares a phase position.

Typically, when windings sharing a phase have phase positions differing by 7C (or one-half shaft period), these windings are wired with opposite polarity; in other words, when current is passed through this phase, it will travel in opposite directions for windings differing in phase positions by 7C; windings within a phase are configured this way so that the force they generate due to interactions with the shaft sum together, as they would cancel each other otherwise.

If construction of an embodiment benefits from separation of windings within a winding pack, windings can be moved to other locations in the winding pack, so long as they are located axially an integer multiple of the phase spatial period from all other windings sharing the same phase.

Driver Description

Phases are selectively and variably provided power through an electric circuit referred to as a 'driver.' There is at least one driver per phase. Drivers are configured to provide power to a phase's windings in both current-flow directions, and are configured to vary that power with a reasonable resolution—for example, with at least 256 levels (8 bits) per direction.

An H-Bridge circuit that is configured to switch a direct-current (DC) supply onto the coils is an embodiment of the driver circuit. The switching frequency of the driver circuit can be over 20 kHz to prevent the generation of an audible noise or "hum." This driver circuit is typically controlled by a microcontroller running software or firmware to realize programmed commutation patterns in response to commanded force outputs.

Phase Position Sensing

Embodiments achieving linear output through the commutation methods discussed below make use of the phase position for every phase included. Thus, an embodiment includes a sensor capable of detecting the phase position of all the phases included. Often, this is done by obtaining a phase position for a single winding (and accordingly for all other windings sharing a phase) and determining the remaining phases' phase position by using the equation of Equation 3; when using the embodiment represented by FIG. 2A as an example, if the phase position for phase A (1A) was measured (in this case to be $7c$), phase position for phase B (1B) would be calculated as $\pi+3\pi/4=7\pi/4$, phase C (1C) would be calculated as $\pi+2*3\pi/4=5\pi/2$ (which is equivalent to $\pi/2$), and phase D (1D) would be calculated as $\pi+3*3\pi/4=13\pi/4$ (which is equivalent to $5\pi/4$).

Examples of suitable phase position sensor are linear position sensors such as an optical encoder that scan a code strip, linear potentiometers, echo or laser sensors; examples are also rotary position sensors provided they are appropriately coupled to the linear motion of an embodiment; an example is also an array of hall sensors that can measure the shaft's magnetic field while rejecting noise from the windings; an illustration of such a sensor (14) appears in FIGS. 1 and 10A.

Shaft-Winding Interaction

Force Response Description

Passing current through a winding in an assembled embodiment will result in magnetic interaction that produces a force between the winding and a shaft. The magnetic field, and therefore the force that is generated, is directly proportional to the current passed through the winding; if the direction of current is reversed, so too is the force. This linearly proportional relationship is referred to as a 'winding force constant' or simply as a 'force constant.' The force constant is considered a transfer function which transforms current into force.

The force constant is similar to another linearly proportional relationship referred to as a 'winding generation constant' or simply 'generation constant.' The generation constant is considered a transfer function which transforms shaft speed into a voltage (and in turn, a current) induced in the winding.

Figure 5A:
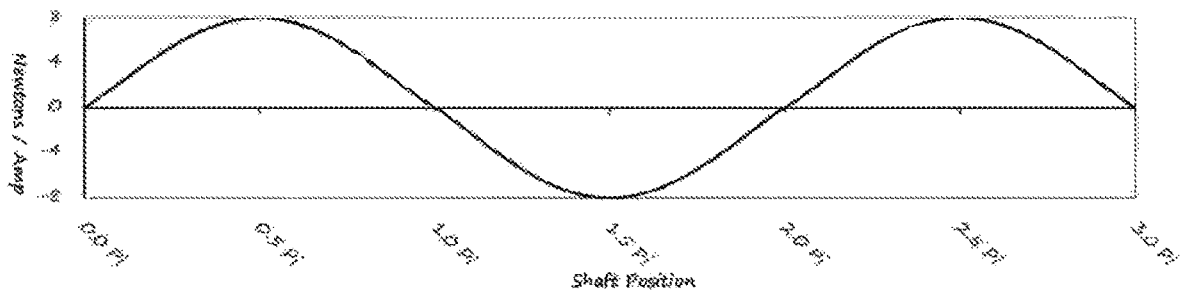
FIGS. 5A, 5B, 5C, 5D are example Phase Response Functions of the four phases of the LEM illustrated in FIGS. 1, 2A and 2B—according to an embodiment.
Figure 5B:
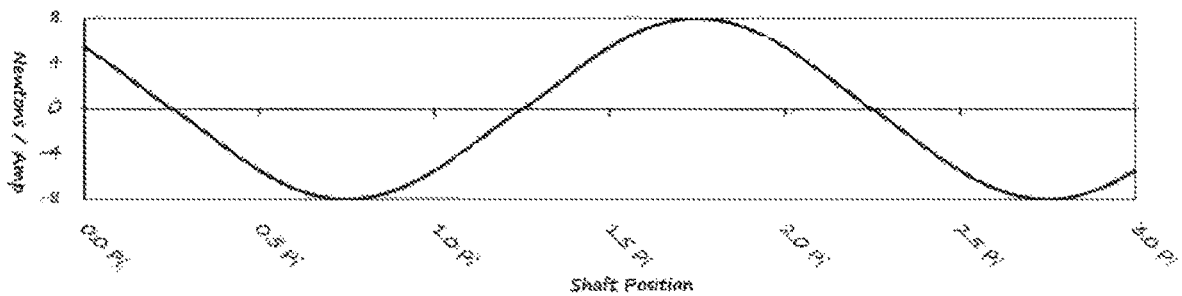
Figure 5C:
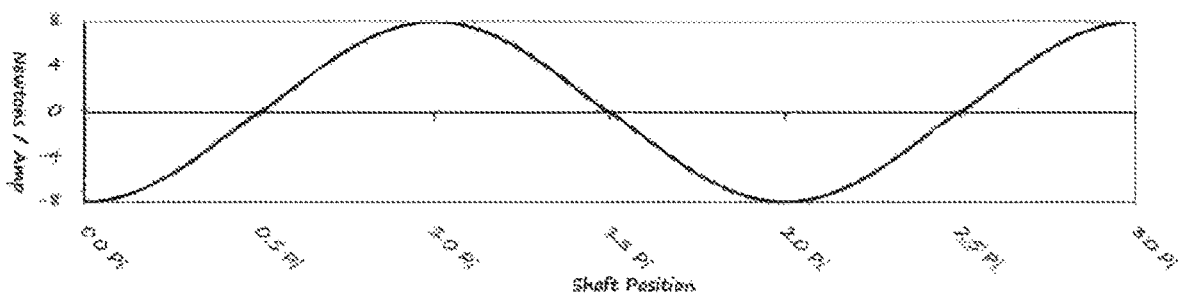
Figure 5D:
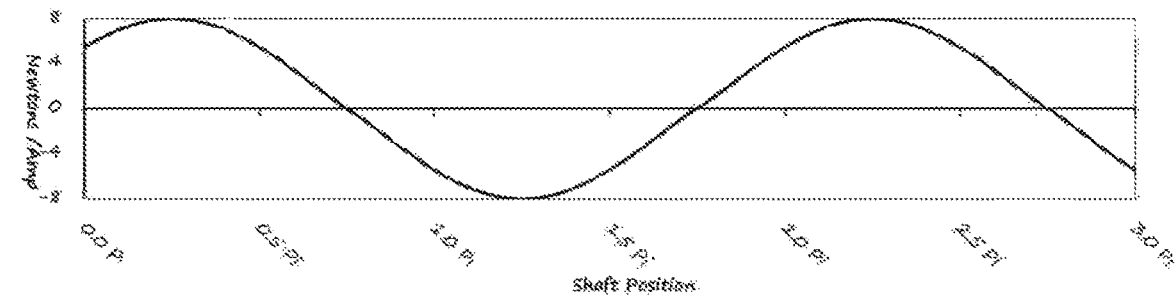
Figure 6A:
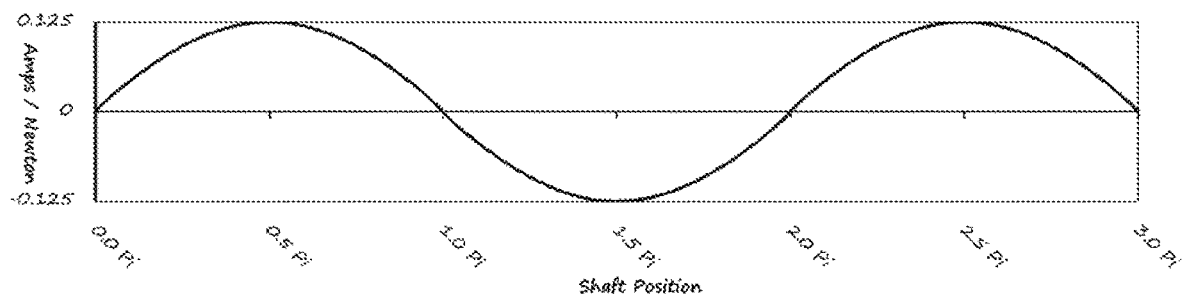
FIGS. 6A, 6B, 6C, 6D are example Phase Commutation Functions of the four phases of the LEM illustrated in FIGS. 1, 2A and 2B.
Figure 6B:
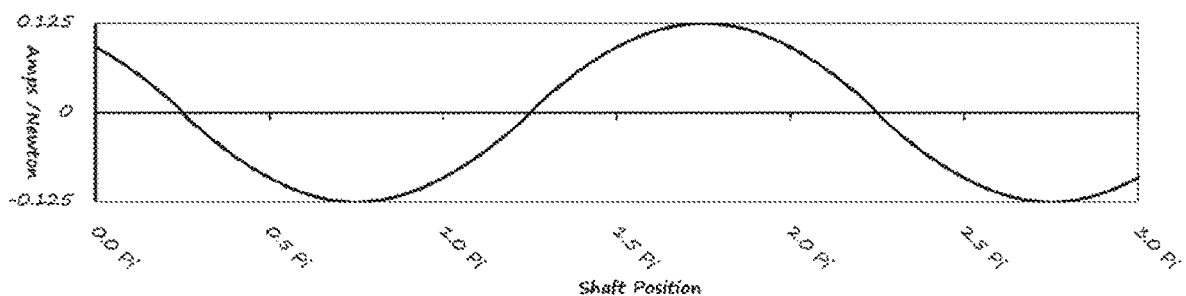
Figure 6C:
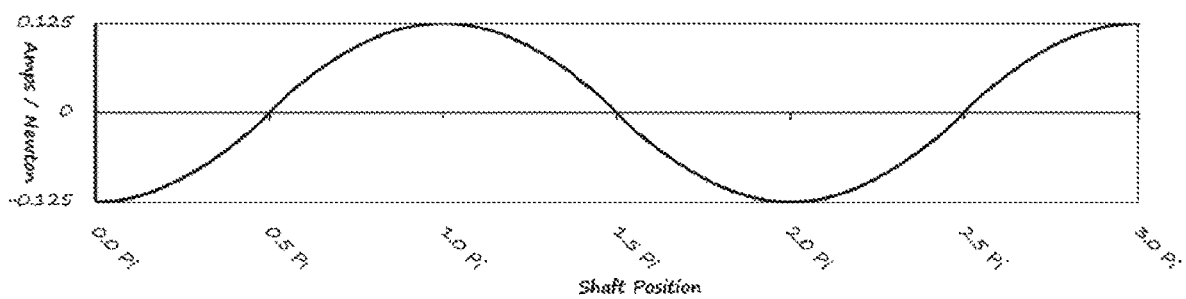
Figure 6D:
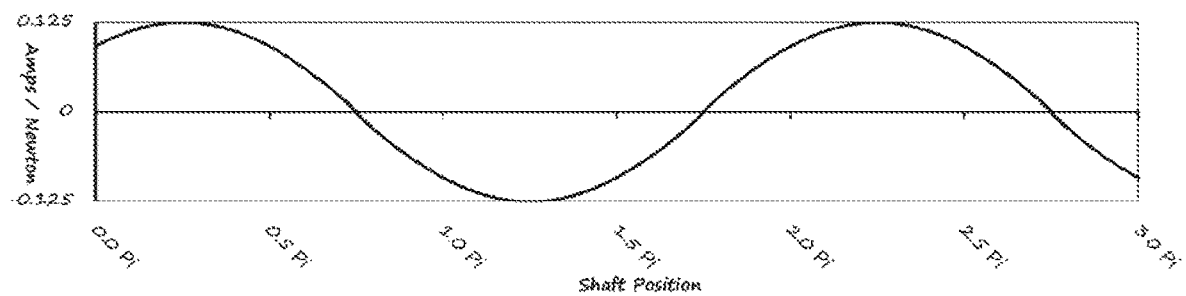

It is convenient to consider the functions generated by plotting the winding force constant, and similarly by plotting the winding generation constant, across shaft positions for an arbitrary winding. These functions are referred to as a 'winding response function' and a 'winding generation function' respectively. FIGS. 5A, through 5D could be examples of winding response functions.

If the winding response function for every winding in an embodiment is known, if the current in every winding is known, and if the phase position is known, the resulting force of the output can be obtained in the following manner: for each winding in the embodiment, multiply the current in the winding by the winding response function (using phase position as argument), which yields the force generated by that winding; sum all the forces to obtain the net force of the embodiment.

Due to the sinusoid-like nature of the shaft field function, the winding response functions are also sinusoid-like. This can be seen by analyzing the winding force constants for various phase positions. First it is important to note that when a magnet is axially centered within a winding, the force constant is zero; that is, no amount of current in the winding will generate force. For example, phase A (1A) of FIG. 2B, which is at phase position zero, cannot produce forces at that shaft position. This is because the shaft field function is equal in magnitude and direction for equal distances to the left and right of the axial center of windings in phase A; the result of generating a field from phase A is to pull the shaft on either side of the winding toward the winding with equal force, or to push the shaft on either side of the winding with equal force—in either case producing no net force. As the shaft moves relative to the phases, the balance of magnetic field on either side of phase A (1A) shifts such that one side will have more net positive field than the other. This imbalance results in a net force produced when current is passed through the winding. The imbalance of magnetic fields on either side of phase A increases up until phase A's phase position is $\pi/4$ or $-\pi/4$ depending on the direction moved; at this position, the imbalance of fields is at a maximum (the shaft field function crosses zero and changes signs at the same location as the axial center of the windings in phase A). Where a perfect balance of field on either side of a winding's axial center produces a force constant of zero, a maximum imbalance of field produces a peak force constant (the sign of the force constant will depend on how the imbalance relates to the polarity of the phase). In any case, because of the sinusoid-like nature of the shaft fields, the force constant will: increase from zero at a phase position of zero to a peak magnitude at a phase position of $\pi/2$; decrease from this peak to zero as the phase position is advanced to it; increase to a peak magnitude of opposite polarity and equal magnitude as at $\pi/2$ as the phase position is advanced to $3\pi/4$; and finally decrease in magnitude again to zero as the phase position is advanced to $2\pi$. The winding response function is thus sinusoid-like.

In some cases, for example if the winding spacing were to be much longer than the winding length, or if the shaft field function was shaped such that it was not sinusoid-like as defined herein, it is possible that the winding response function is not sinusoid-like; these geometries are not typical embodiments, and embodiments making reasonable use of the materials used in their construction will produce sinusoid-like winding response functions.

One important relationship between winding response functions and winding generation functions is that they are linearly proportional to one another. For a winding, energy transformations in both directions (i.e. from electrical energy to mechanical energy and from mechanical energy to electrical energy) rely on the density of magnetic fields in the vicinity of the winding. In fact, both phenomena are linearly proportional to the density of magnetic fields; that is to say that if the magnetic fields in the vicinity of a winding are scaled by some number—for example, if they are doubled—then forces generated by current through that winding are in turn doubled, and voltage generated by moving those magnetic fields is likewise doubled. Because the shaft is the source of magnetic fields in the vicinity of the windings, the shaft is what dictates how the windings produce force in response to current and how the windings produce voltage in response to shaft movement. For this reason, when the shaft is in a position such that the force constant for a winding is zero (i.e. phase position zero), then the winding's generation constant is zero; likewise, when the shaft is in a position such that the force constant is maximized, so too is the generation constant. Finally, when the shaft is moved to a position such that the force constant is doubled, so too is the generation constant doubled. Another convenient way of illustrating this relationship is by normalizing the winding response function and the winding generation function according to their maximum magnitudes, and plotting them on the same chart; when this is done, the two functions perfectly overlap. The relationship between response functions and generation functions is important when describing the damping forces that are experienced as the shaft is moved and the induced voltages are allowed to produce current in the windings which resists the shaft motion (i.e. electric braking).

Like all electric machines, embodiments described herein can produce force in response to shaft motion. These forces are the result of currents induced into the windings when the shaft is moved. The concept of a change in magnetic fields through a winding (i.e. shaft motion through windings) has long been exploited as a means to transform energy; it is used in motors as a form of braking when windings are shorted together to allow the induced currents to circulate through the windings which in turn produces forces that oppose the motion that caused the change in fields.

Embodiments described herein also exhibit this property; if winding leads are shorted together (for example by connecting them both to ground through an h-bridge driver), then motion of the shaft will cause the magnetic fields within the coils to change, which in turn generates a voltage within the windings, and in turn results in current flowing through the winding; the force due to said current can be conveniently calculated by multiplying said current by the winding response function for the winding containing the current. Additionally, the voltage (and in turn, the current) generated in a winding by shaft motion can be calculated by multiplying said shaft motion by the winding generation function for said winding. It follows that the force generated by a winding due to shaft motion in an embodiment, is found by multiplying the shaft motion by the winding generation function (which yields a current) and further multiplying the result (the current) by the winding response function. The force generated by an embodiment can be found by summing all such winding forces due to shaft motion.

In at least most electric machines, the forces generated due to motion are not smooth; that is to say that the forces generated are not constant with respect to position. The force ripple associated with this response is commonly termed "cogging," although this phenomenon is not the only factor causes electric machines to "cog" or exhibit force ripple.

A similar function to the winding response function is the 'phase response function.' The phase response function is the sum of the winding response functions of the windings within a phase. All windings within a phase have similar winding response functions, in that they are phase shifted by an integer multiple of one-half the shaft period (i.e. by $n*\pi$ where n is an integer). As previously discussed, when winding differ in phase position by $\pi$, the polarity of these windings is reversed; this ensures that their winding response functions sum and do not cancel. When functioning correctly, a phase response function is equal to the product of the number of windings in a phase multiplied by any winding response function of a winding included in that phase. The phase response function for a phase is therefore also sinusoid-like. Examples of phase response functions appear in FIGS. 5A though 5D.

Because all the windings within a winding pack are constructed such that they generate a similar magnetic field in response to current, all phase response functions in an embodiment have the same shape; because windings are spaced evenly along the central axis, their response functions are translated relative to one another. It is convenient to define a 'characteristic response function' (shown in the block diagram of FIG. 8) which crosses the origin and initially increases (like the sin-function), and which has the same shape of the phase response functions. The phase A response function (shown in FIG. 5A) of the embodiment shown in FIGS. 2A and 2B is then said to be the characteristic response function for said embodiment; in this case, the phase response function for any other phase can be obtained by phase-shifting the characteristic response function by an amount equal to the phase-shift between that phase and phase A. For example, the phase response function for phase C (shown as 1C in FIGS. 2A and 2B) is equal to the characteristic response function (or the phase A response function FIG. 5A), shifted by $3\pi/2$.

Commutation Method

One commutation method combines the following configurations: the sinusoid-like shaft field function; the relationship between winding period, shaft period, and the number of phases; and the previously discussed organization of windings into phases.

$$\sum_{n=0}^{N-1} \sin^2\left(\theta - \frac{n*\pi}{N}\right) = \frac{N}{2} \qquad \text{Equation 1}$$

The above is an equation representing the trigonometric relationship expressing the sum of N squared sinusoidal samples that are evenly distributed across a half-period as the constant value N/2, regardless of the phase angle used as argument.

$$T_{shaft} = \frac{2N_{phases}}{N_{phases} - 1} T_{winding} \qquad \text{Equation 2}$$

The above ratio is an equation representing a relationship between the shaft period ($T_{shaft}$), the number of phases ($N_{phases}$), and the winding period ($T_{winding}$); when a motor using these geometries is combined with a shaft having any sinusoid-like field function, a phase commutation function can be obtained to produce a linear force response.

$$\Delta\varphi_{winding} = \frac{T_{winding}}{T_{shaft}} 2\pi = \pi - \frac{\pi}{N_{phases}} \quad \text{Equation 3}$$

Above is an equation, in radians, for the phase-shift between any two adjacent phases. By multiplying both sides by $N_{phases}$, it is clear that the total phase-shift covered by all phases in a motor constructed according to this ratio is an integer multiple of pi radians. This even distribution of phases is useful in exploiting the trigonometric relationship of Equation 1 in order to achieve linear force output without relying on a force-sensor for feedback control (i.e., in order to achieve linear force output with open-loop force control).

It is convenient to recall that magnetic fields, and magnetic force interactions, are subject to the superposition principal; in other terms, the resulting force generated between a shaft and a winding pack is the vector sum of the forces generated by every individual winding.

Commutating an embodiment requires a function which dictates how windings should be selectively powered given a shaft position and given a commanded output; such functions are referred to as a phase commutation functions. Phase commutation functions appear in block diagram FIG. 8. These functions are plotted as current per commanded force output versus shaft position. When these functions are passed a phase position as argument and multiplied by the commanded force, a current for the associated phase is obtained; the force generated in said phase due to said current can be calculated by multiplying said current by the result of the associated phase response function, using the same given phase position as an argument.

Phase commutation functions are assumed to be sinusoid-like, and similar to their associated phase response functions in terms of zero-crossings (and thus peak magnitude locations); this assumption ensures that zero current is passed through the phase when the force constant is zero, and that maximum current is passed through the phase when the force constant is maximum. A result of this assumption is that the phase commutation function is subject to the same convenience of phase response functions: they can be represented by a single characteristic function that is phase-shifted to obtain specific phase response functions. The characteristic commutation function appears in block diagram FIG. 8.

The output of the embodiment can be determined by adding the force generated by each phase.

$$\text{Force} = \sum_{n=0}^{N-1} crf(\theta + n*\Delta\varphi_{winding}) * ccf(\theta + n*\Delta\varphi_{winding}) * C \quad \text{Equation 4}$$

The above equation illustrates this concept; elements of the summation represent all the phases in the motor having been commutated by applying an appropriate phase shift of the characteristic response function (crf) and characteristic commutation function (ccf); commanded force (C) is multiplied by every phase commutation function at the phase position ($\theta$) which returns a current, which is multiplied by the phase response function at the phase position ($\theta$), which returns the force generated by that phase; these forces are summed and the output of the embodiment is predicted.

Equation 4 can be rewritten as follows:

$$\text{Force} = \sum_{n=0}^{N-1} crf\left(\theta + \pi n - \frac{\pi n}{N_{phases}}\right) * ccf\left(\theta + \pi n - \frac{\pi n}{N_{phases}}\right) * C \quad \text{Equation 5}$$

By noting that the product of two sinusoid-like functions sharing zero-crossings and peak polarities is again periodic, and the product's period is half that of either sinusoid's original period, Equation 5 can be further simplified to:

$$C * \sum_{n=0}^{N_{phases}-1} crf\left(\theta - \frac{\pi n}{N_{phases}}\right) * ccf\left(\theta - \frac{\pi n}{N_{phases}}\right) = \text{Force} \quad \text{Equation 6}$$

Figure 7A:
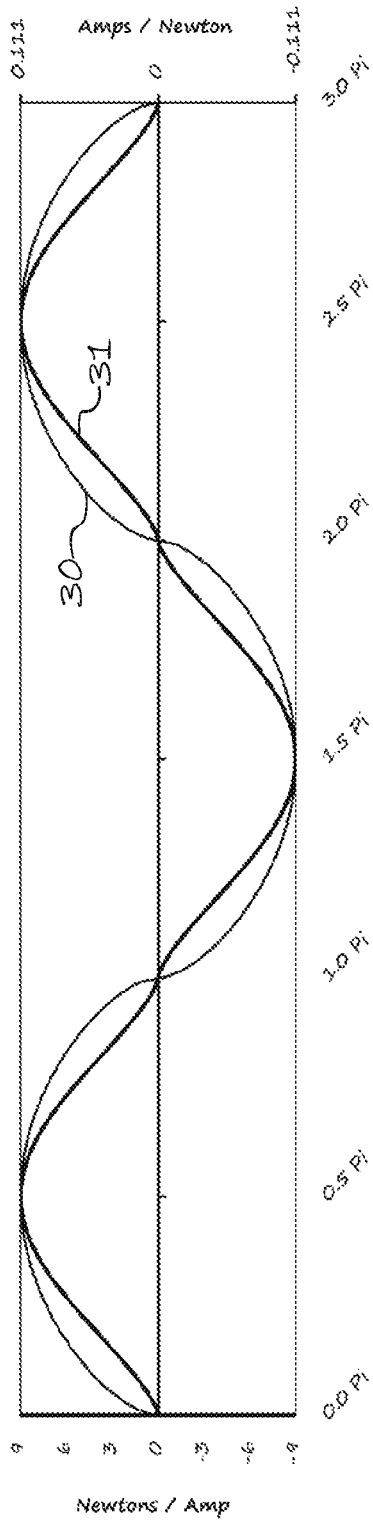
FIGS. 7A and 7B show two examples of characteristic commutation functions (thin lines), overlaid with characteristic response functions (thick lines)—according to two embodiments.
Figure 7B:
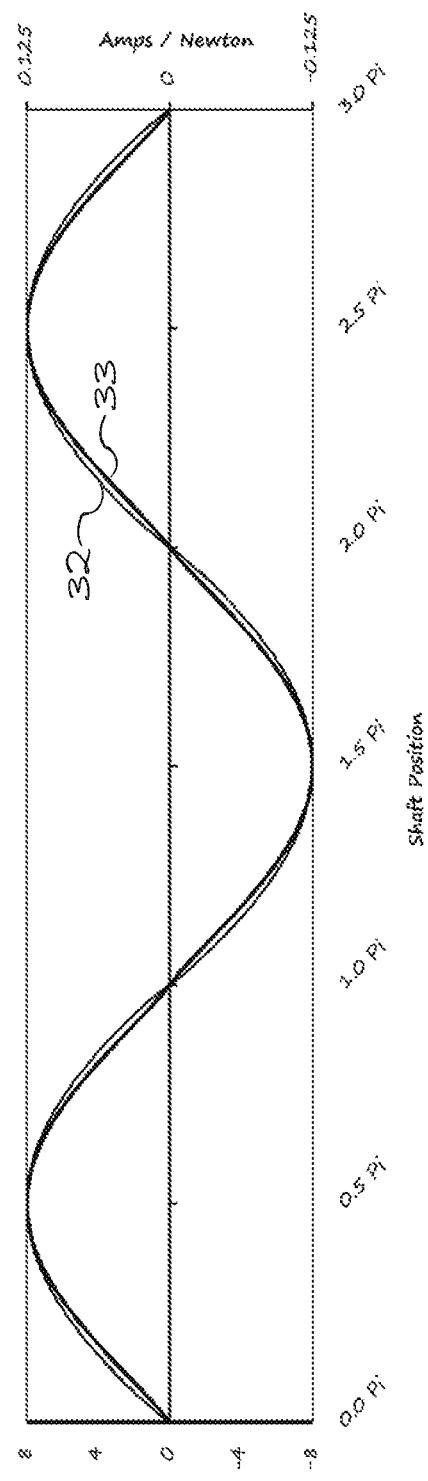

The examples of FIGS. 7A and 7B can be used to see that if these functions are multiplied together, the resulting function's period will be 7C instead of a as the product of two negative numbers is positive. This mathematical concept follows from the fact that magnetic interaction is equal in magnitude and opposite in polarity when one of the sources has its polarity flipped. For example, the phase response function of FIG. 5A between zero to 7C is similar to the response from $\pi$ to $2\pi$, except that the polarity is flipped. This reversing of polarity is owing to the fact that from $\pi$ to $2\pi$, a shaft field function is equal in magnitude and opposite in polarity when compared to that shaft's field function from zero to $2\pi$; FIG. 3B can be used to see this graphically. Thus, the term of n$\pi$ in Equation 5 is redundant as it represents an integer multiple of a period and is removed from the function argument.

To achieve a linear force output, regardless of the shaft position, the similarity between Equation 1 and Equation 6 is exploited. If the commanded output ('C') is taken to be constant, as is the case when a constant output is desired, it can be taken outside from the summation. If for every phase position, the product of the characteristic response function and the characteristic commutation function is equal to the product of 2 multiplied by the $\sin^2$-function, then divided by N, then Equation 6 simplifies to:

$$C = \text{Force}; \quad \text{Equation 7}$$
$$\text{assuming: } crf(\theta) * ccf(\theta) = \frac{2}{N}\sin^2(\theta)$$

It can be seen in Equation 7 above that given a constant commanded force, regardless of the shaft position, the response of the embodiment is constant. Furthermore, the force output is linearly proportional to the commanded force, regardless of the phase position. The properties of said $\sin^2$-function are discussed in more detail below.

If follows that in order to achieve a linear force response that will not ripple with position, a characteristic commutation function can be generated according to the following relationship:

$$ccf(\theta) = \frac{2}{N} * \frac{\sin^2(\theta)}{crf(\theta)} \quad \text{Equation 8}$$

Corresponding phase commutation functions can be obtained via the following:

$$pcf_n(\theta) = ccf(\theta + n\Delta\varphi_{winding})$$ Equation 9

Figure 4A:
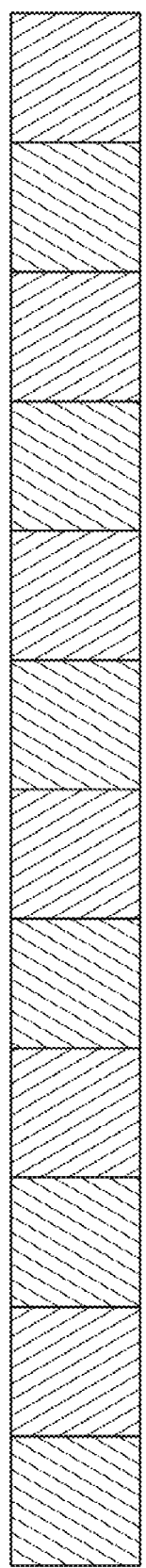
FIG. 4A is a cross sectional view of a shaft constructed of only permanent magnets of alternating polarities—according to an embodiment.

FIG. 7A illustrates an embodiment's characteristic response function (thick curve 31—left y-axis) overlaid with the characteristic commutation function (thin curve 30, right y-axis) that was found using this method; in this case, the embodiment's shaft did not space permanent magnets apart, similar to an embodiment represented by FIG. 4A. FIG. 7B illustrates another embodiment's characteristic response function (thick curve 33, left y-axis) overlaid with the characteristic commutation function (thin curve 32, right y-axis) that was found using this method; this embodiment makes use of iron spacers and has similar dimensions to an embodiment represented by FIG. 3A.

The $\sin^2$-function used in generating a commutation function from a response function is horizontally scaled and translated such that it has zeros which are spatially aligned with the zeros of the characteristic response function; in other words, the $\sin^2$-function is horizontally scaled such that the period of the $\sin^2$function becomes one-half the period of the characteristic response function; for example, if such a $\sin^2$-function was to be used with a characteristic response function similar to FIG. 5A, the period of the $\sin^2$-function would be $\pi$. In embodiments where the characteristic response function does not cross the origin, the $\sin^2$-function is also translated such that the zeros of the two functions align. It is also assumed said $\sin^2$-function has a magnitude of 1 and it unitless. It is useful to note that the $\sin^2$-function is always positive, thus a function derived by dividing the $\sin^2$-function by a phase response function will have values with the same sign (i.e. positive or negative) of the phase response function at all points. It is also useful to note that a function derived by dividing such a $\sin^2$-function by a phase response function will have units of current per force.

When command of specific forces is used in an embodiment, one should keep track of the units used when deriving the commutation functions. When a commutation function is formed from a response function, the response function's values (force-constants) are in unit of force per unit of current, and these same units will be used in the commutation process: said unit of force is used to scale the commutation function to derive said unit of current, which is passed through the corresponding winding. In this way, specific commanded forces are realized at any arbitrary shaft position—for example, in units of newtons.

When command of specific forces is not required (i.e. when inputs relate only to maximum output of the device, and not a specified force), only the shape of the functions needs to be maintained; in other words, response functions can be normalized according to their peak magnitude, and the 2/N term in Equation 8 is removed; the result of such normalization will result in a commutation function having a peak value of one. The maximum allowable input to be used (i.e. scaled by commutation functions) is then typically defined to equal the maximum current allowable in a phase. It is important to note that when functions are normalized as such, only a linear output is achieved: specific knowledge of the output is not possible without further profiling techniques.

Force Sensing

When an embodiment has access to the response functions that relate to its phases (e.g. if said response functions are saved to the permanent memory of a microcomputer included in the embodiment), and further has access to the amount and direction of current in its phases (e.g. the embodiment has drivers having current sensors), then the embodiment can determine the amount of force generated. This force generation could be due to power being selectively applied to the phases to achieve commutation, or could be due to currents induce in the phases due to shaft motion; in any case, the force generated is equal to the sum of the current in all phases multiplied by the corresponding phase response functions.

Applicability to Rotary Motors

It is recognized also that the characterization methods disclosed herein apply equally to permanent-magnet brushless rotary motors in producing a linear torque output. That is to say that a characteristic response function can be measured or predicted, and a characteristic commutation function that would produce linear torque output can be easily determined using the discussed method, due to rotary motors' periodic nature and even distribution of phases.

Typical Implementations of Method

Post-Profiling: Text Fixture

One method for constructing an embodiment involves building or obtaining a machine with an appropriate shaft response function and relationships that satisfy Equation 2 without concern for the shape of the characteristic response function. The characteristic response function can then be measured in at least two ways.

First, some known quantity of current can be applied though a phase of an embodiment. The force output can be measured over a range of values at least equal to one shaft period; a single period of this response (divided by the known quantity of current applied to said phase) is the characteristic response function. A suitable method of accomplishing this is by attaching a load cell between the shaft of an embodiment and a moving stage; the stage is moved while powering a phase in the embodiment and the forces are measured at a number of shaft positions. To get the corresponding characteristic commutation function, Equation 8 is employed.

Post-Profiling: Current-Sense

Alternatively, owing to the previously discussed relationship between the response function and the generation function, the shafts of an embodiment can be moved while the shaft speed, shaft position, and current through a phase is measured. If each measured current sample is normalized according to the speed of the shaft when it was taken, then the resulting normalized periodic function will have the same shape as the characteristic response function. This method does not produce a characteristic response function with units of force-per-current, as the generation function was normalized thus producing a unit-less function, but the shape can still be combined with a $\sin^2$-function according to Equation 8—the result of which can be scaled by an appropriate value to yield a characteristic commutation function that will produce a linear force output. While this method fails to enable a known force output from a commanded force without additional profiling, it enables linearization of an embodiment with very little electronics and no profiling fixture; this method is typically achievable using only a current-sense-enabled driver typically included in an embodiment.

Pre-Profiling

If an accurate model of the response function can be obtained using a software modeling program, this response function can be used to obtain commutation functions via Equation 8.

Pre-Designing

Another method of constructing an embodiment involves building the device such that it naturally has a sine-shaped characteristic response function. This can be accomplished using electromagnetic simulation integrated into 3-D computer-aided drawing software and typically iron spacers are used when designing sinusoidal characteristic response functions; typically, the ratio of iron to magnet used in a shaft is manipulated to change and shape the characteristic response function during design, although other methods (e.g. using non-magnetic spacers) are also sometimes used. When an embodiment having sinusoidal response functions is driven using commutation functions having the shape of a sine function, its force output will be linear and will have no ripple. Two advantages of this method are that no force-measuring characterization process is required, and the damping response (i.e. electric braking) will be linear (discussed later).

FIGS. 1, 2A, and 2B are examples of an embodiment with nearly sinusoidal phase response functions (said phase response functions can be seen in FIGS. 5A, through 5D) that can be driven with sinusoidal commutation functions to achieve a good linear output; when such an embodiment is used in a feedback controller—for example, a helicopter simulator controller—the linearity of the output is such that the human operating the simulator cannot discern the output ripple. Furthermore, when driven by phase commutation functions shown in FIGS. 6A through 6D, which can be obtained using the method described herein, the output can be linearized to, for example, within approximately one-percent at any position.

Magnet Spacing

Figure 4B:
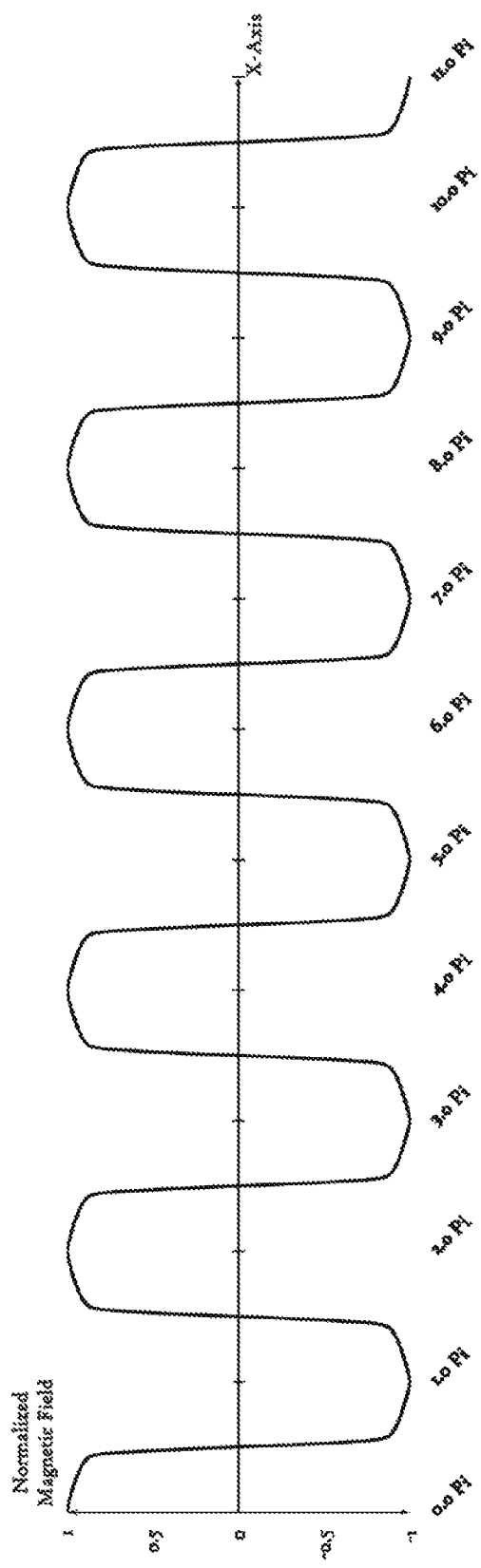
FIG. 4B is an example of the field function according to the shaft shown in FIG. 4A and has a similar relationship to FIG. 4A as FIG. 3B has relationship to FIG. 3A.

Magnetic materials like iron can be used in between permanent magnets in a shaft to gain a number of advantages and change the way an embodiment performs. Magnetic materials such as iron are said to have magnetic domains which can be described as regions within the material that are magnetized in a uniform direction; this means that the individual magnetic moments of the atoms are aligned with one another and they point in the same direction. The direction in which domains align depend entirely on the vector sum of fields within the domain; the vector sum of fields is due in part to neighboring domains, induced fields due to current passing through nearby windings, permanent magnets in the proximity of said domains, and other magnetic phenomena. The fields of the iron or other magnetic material will constructively interfere with the shaft's field, resulting in a greater field magnitude within and immediately surrounding the material. Magnetic material used as spacers thus results in a shaft field function curve with a different shape than if non-magnetic spacers, or no spacers (back-to-back adjacent magnets as in FIG. 4A) were used in an embodiment. In general, the addition of iron spacers between permanent magnets results in a shaft field function that is smoother—or at all positions is changing values more gradually—than if a shaft is constructed purely of alternating permanent magnets. FIGS. 3 and 4 illustrate two shafts of different construction and the resulting shaft field function.

Iron Advantage: Easier Manufacture

Figure 9A:
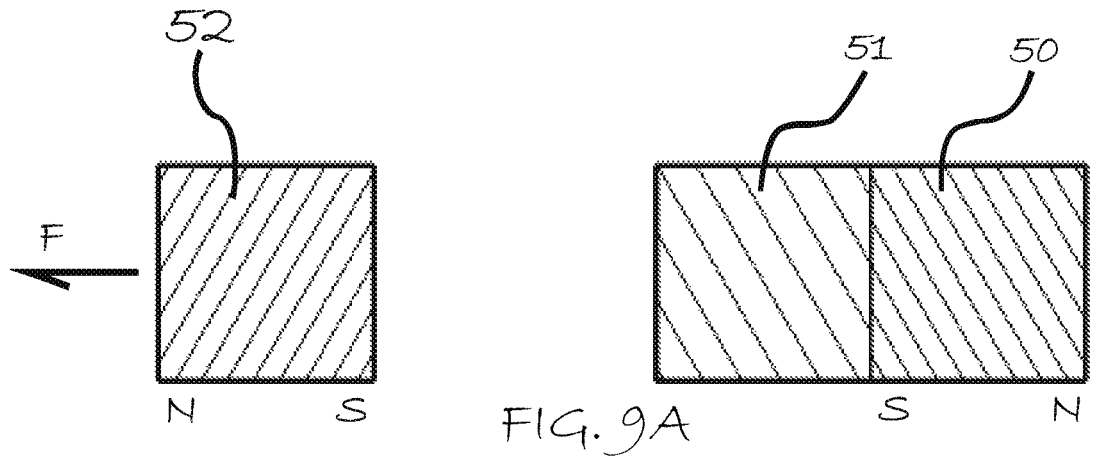
FIG. 9A through 9D depict the forces experienced by a magnet during assembly when magnetic materials are used as spacers, and also depicts the domains of said magnetic material as said magnet is forced toward the spacer—according to an embodiment.
Figure 9B:
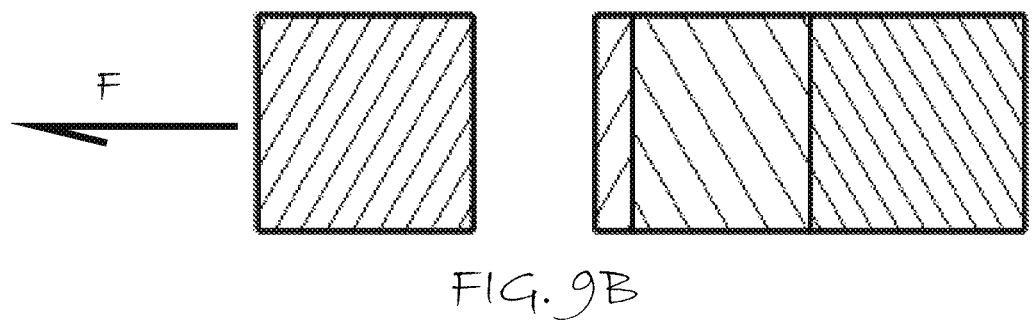
Figure 9C:
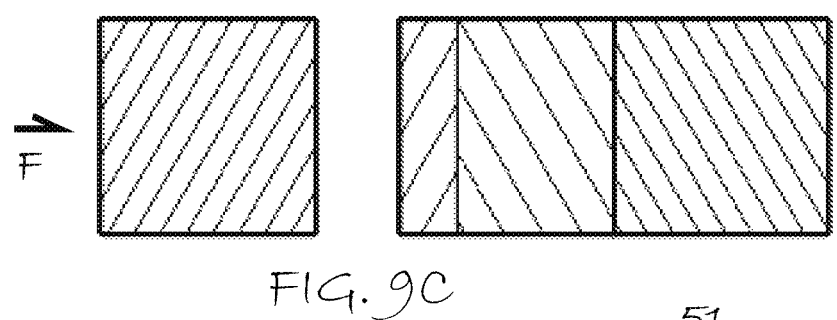
Figure 9D:
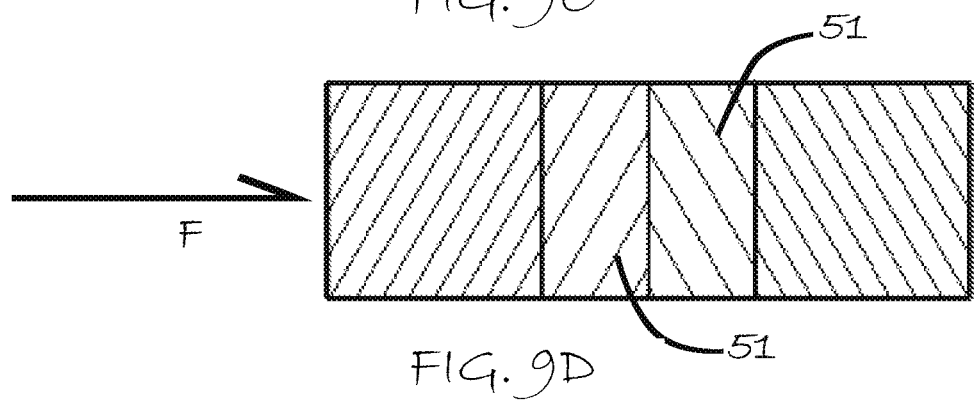

During assembly, magnetic spacing materials can cause the alternating-polarity permanent magnets to stay in place, stuck to the spacer, instead of repelling each other and requiring significant assembly forces. FIGS. 9A through 9D are used to illustrate this concept; in these sectional views, hashmarks are used to indicate both material type (hash spacing) and magnetic domain alignment (hash angle); for example, materials with parallel hashmarks share domain alignment. Force vectors beside 52 are included to depict the (axial) force experienced during assembly; forces experienced by magnet 50 and iron 51 are not shown. When a magnet (50) is placed near an iron spacer (51) as in FIG. 9A, the iron spacer aligns its domains with the magnet and a force is generated attracting the two. As a second magnet (52) oriented opposite the first approaches the iron spacer (51), initially a repulsive force is experienced (also shown in Equation 8). As magnet 52 is forced toward spacer 51, magnetic fields from 52 will overpower the magnetic fields from magnet 50 in a portion of iron 51 as shown in FIG. 9B. More domains in iron 51 change polarity as the distance between iron 51 and magnet 52 decrease; the force experienced by magnet 52 in turn decreases and eventually also changes polarity as shown by FIG. 9C. When the three components are connected as in FIG. 9D, they all experience attraction. Iron spacer 51 experiences a repulsion force between its domains of opposite polarity, but atomic forces are significantly higher than the magnetic-repulsion force and, therefore, hold the material together.

Embodiments having magnets spaced adjacent with no spacers, as in FIG. 4A, will exhibit extremely high assembly forces which may necessitate special machines for production. In the event a shaft is damaged or disassembled, the contents of said shaft may come apart, accelerating rapidly, and pose a danger to machines and people nearby. Embodiments having sufficient magnetic material in between permanent magnets such that the local domain forces overpower the repulsive forces of the nearby magnets (as in FIG. 9D) can be assembled by hand, and would not fly apart if the shaft were damaged or disassembled.

Iron Advantage: Improved Effectiveness

When designed correctly, iron spacers between permanent magnets can be a cost-effective method of increasing the efficiency at which current is converted to force, and shaft motion is converted to current. Because iron is a significantly less expensive commodity than the neodymium typically used in electric machines, a shaft's field function can be increased in magnitude without significantly increasing the cost of materials for an embodiment, for a given volume of neodymium used. Since the effectiveness of transforming current into forces or shaft motion into current in a LEM is dependent (among other things) on the flux within the shaft, increasing the magnitude of the shaft field function by using iron spacers increases the effectiveness of a machine's energy conversion, without incurring the costs of higher neodymium volumes. An example of improving an embodiment's performance-to-cost ratio by using iron spacers can be described using FIGS. 3A and 4A. The material costs of the shaft depicted in FIG. 3A will be typically between half to two-thirds the costs of the shaft detailed in FIG. 4A. However, the performance of the two devices is more similar in nature—typically having the embodiment of FIG. 3A generating between seventy percent to ninety percent of the forces of the embodiment of FIG. 4A, for a given amount of electrical power. In other words, adding iron or other magnetic materials into a given shaft dimension allows design of embodiments to achieve different cost-to-performance ratios. It is recognized that this advantage also applies equally to embodiments used for motion-to-electrical energy generation, and equally to embodiments used for both directions of energy conversion.

Iron Advantage: Faster Linear Force Output

As previously discussed, magnetic spacer materials tend to create a smoother shaft field function. Smoother shaft field functions result in a more gradually changing imbalance of magnetic fields on either side of a winding as the shaft position is changed; this in turn yields a phase response function that changes more gradually, which typically yields a commutation function that changes more gradually. The inductive nature of windings places a limit on the rate at which current can change with the windings—the maximum rate typically being a function of the voltage available to the drivers. Thus, an embodiment having a smoother characteristic commutation function (and all other things being equal), will be enabled to move at a higher rate while sustaining linear output than another embodiment having "sharper" characteristic commutation functions.

Iron Advantage: Linear Damping Response

As discussed, LEMs and all electric machines can produce force when subject to motion. As an embodiment's shaft moves relative to a winding pack, a change of flux through the windings results in a voltage, and consequently a current to flow through the windings. When constant motion is applied to the shaft (or winding pack), the voltages induced into the phase windings form a function versus the shaft position; these functions were previously described as phase generation functions, and it was discussed that these functions are identical in shape (once normalized) to the phase response functions. As discussed, the resulting force due to shaft motion can be obtained by summing the forces generated in each winding, or specifically, by multiplying the shaft motion, the winding (or phase) response function, and the winding (or phase) generation function for every winding (or phase), and summing the results.

An advantage of constructing a shaft that produces a characteristic response function shape that is very close to the sine-function, is that motion of the shaft will then generate sinusoidal current waveforms in the phases (because a sinusoidal response function implies a sinusoidal generation function), which when multiplied by the sinusoidal response waveforms will take the shape of a $sin^2$-function; in other words, a sinusoidal characteristic response function means that constant shaft motion will cause the phases to generate $sin^2$-shaped forces (opposing said motion). Due to the previously discussed result of the sum of evenly-distributed $sin^2$-functions (shown mathematically by the equation of Equation 1), the force produced as a result of shaft motion is linear (i.e. has relatively low ripple). A term for this result is 'linear damping response' and can be considered as 'linearized cogging.'

While an embodiment with very "sharp" response functions can obtain linearized output using the commutation methods provided herein, said embodiment's damping response is a function of its construction alone.

Iron Advantage: Reduced Sensor Resolution Requirements

The phase-position resolution requirements of an embodiment depend on the geometry and required performance of an embodiment; in general, commutation functions that deviate greatly from a sine-function (i.e. "sharper" functions) may require higher-resolution position sensing than those commutation functions that are smoother. Thus, another advantage of including iron in an embodiment and achieving characteristic commutation functions close in shape to a sine wave, is that shaft-position-information resolution can be lower. Exact resolution requirements depend on implementation, but in general, if an embodiment's characteristic commutation can be made smoother than another embodiment's, the position resolution required to describe the same delta of commutation function (i.e. delta of phase current) between any two adjacent measurable shaft positions, will be decreased (improved) by the former embodiment. As the delta of phase currents between any two measurable shaft positions increases, commutation between those positions will result in an increasing delta in force output: a "tick" or a step function in force output; determining the minimum sensor resolution requirements involves defining the minimum "tick" or step that's acceptable. Given the characteristic commutation function, the minimum step in commutation function will define the minimum sensor resolution.

Iron Drawback: Saturation Requirements

When ferrous spacing material is used, the shaft is configured to ensure that the field strength within the spacer material from the adjacent magnets is greater than the maximum field strength generated by the windings during operation; if this is not observed, a significant percentage of the domains of the spacer material can change during operation of an embodiment. If the domains of the magnetic spacer material change due to the commutated winding fields, the shaft field function changes with them. In at least one advantageous method of commutation discussed herein, linear output of an embodiment is dependent on knowledge of the relationships between the shaft and winding pack; if these relationships are altered—as changing the shaft field function would achieve—the linearity of the output could be compromised Non-Magnetic Magnet Spacers Magnets also can be separated from one another using non-magnetic materials like plastic. Like the method of adding magnetic spacer material, using non-magnetic spacers can result in a commutation function that is closer to a pure sine wave (i.e. smoother), as the shaft field function will change directions over a wider range of values. Configuring magnets to be spaced apart by non-magnetic materials can achieve a linear damping response as described above and can improve the maximum speed at which a linear response is possible as described above. Configuring magnets to be spaced apart by non-magnetic materials will decrease the assembly forces required to construct the shaft, when compared to when magnets are configured to be touching each other.

Typical Operation

Typically, the commanded output and phase position are received by a microcontroller (represented in FIG. 8 by box 24); the microcontroller, having the phase commutation functions saved to its permanent memory, or having the characteristic commutation function and the number of phases saved to permanent memory such that it can derive the phase commutation functions via Equation 9, combines the phase commutation function with the phase position and multiplies the results by the commanded output to receive the respective phase currents; the microcontroller then manipulates the drivers to realize these currents within the windings, thus producing the commanded output.

Often, functions like the characteristic commutation function are saved to the memory of a microcomputer in the form of a lookup table that is indexed by the phase position, or by the result of some math involving the phase position.

It is recognized that a microcontroller, or other entity capable of performing the commutation method, may control current to the windings in a number of ways, including by using applied voltages (or h-bridge duty cycles), or alternatively by using feedback from current sensors and some closed-loop control method—typically a proportional-plus-integral control method.

Because the forces generated are entirely dependent on the current within the windings, and because current does not change instantly when subject to an applied voltage, using voltage control alone to realize the commutation currents (e.g. by multiplying the required current by the phase resistance and applying the result in the form of a voltage), can degrade the linearity of the response, as the resulting currents are not realized instantly. Often this problem is improved upon by using current sensors that generate a signal that is used in closed-loop current control to reduce the realization time of the commutation calculations. Current control also ensures that as windings heat up (possibly unevenly), the current delivered them to does not decrease. The embodiments described herein are typically driven and controlled using these and other methods common to the driving and controlling of other electric machines.

Figure 11A:
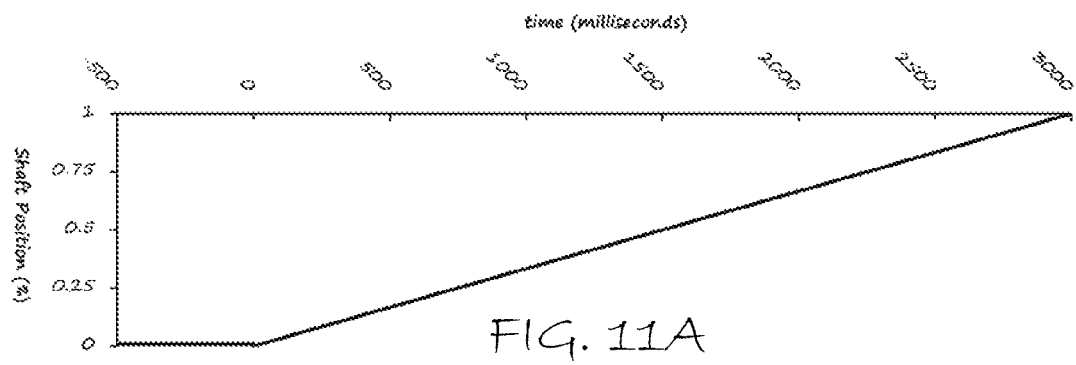
FIG. 11A is a time-based graph illustrating a shaft moving at constant velocity after time zero—according to an embodiment.
Figure 11B:
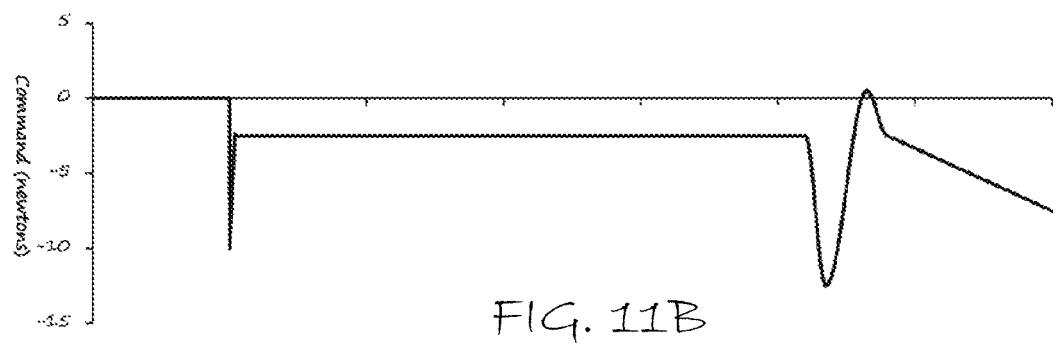
FIG. 11B is a time-based graph illustrating a commanded force output at various points in time—according to an embodiment.
Figure 11C:
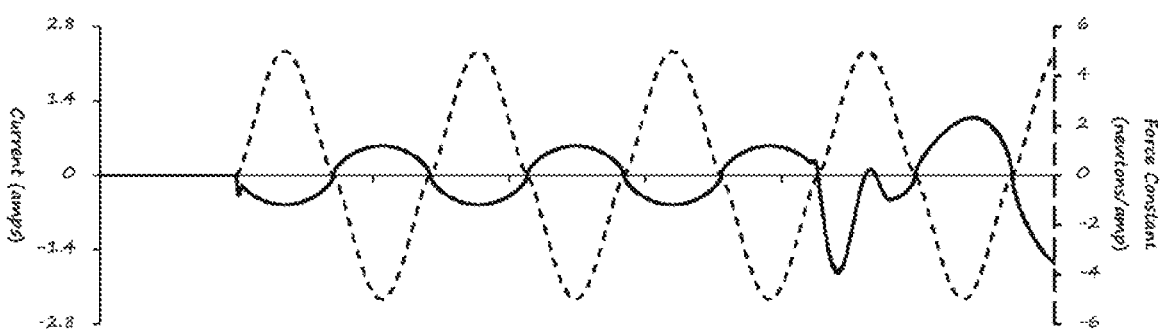
FIG. 11C is a time-based graph illustrating the current within phase A of a two-phase LEM (solid line), and includes the phase A response function overlaid (dashed line)—according to an embodiment.
Figure 11D:
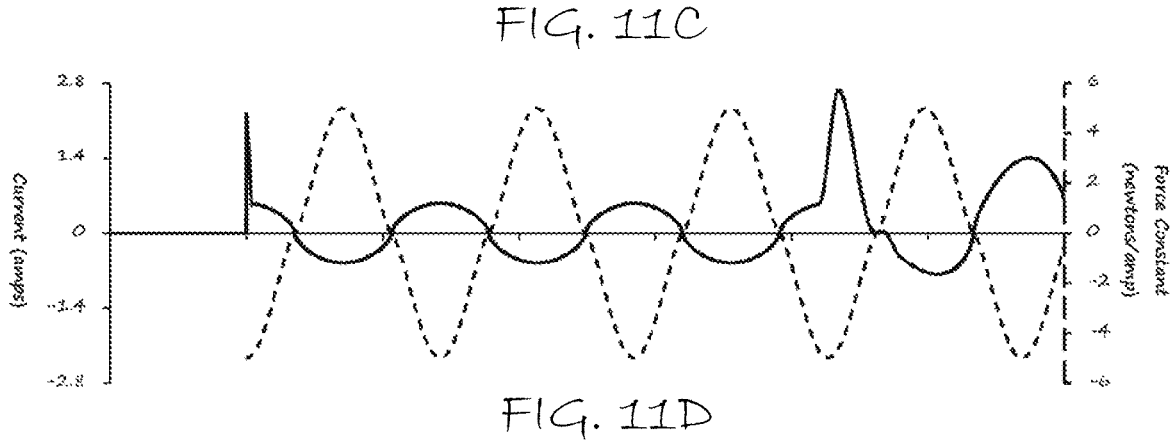
FIG. 11D is a time-based graph illustrating the current within phase B of a two-phase LEM (solid line, left y-axis), and includes the phase B response function overlaid (dashed line, right y-axis)—according to an embodiment.
Figure 12A:
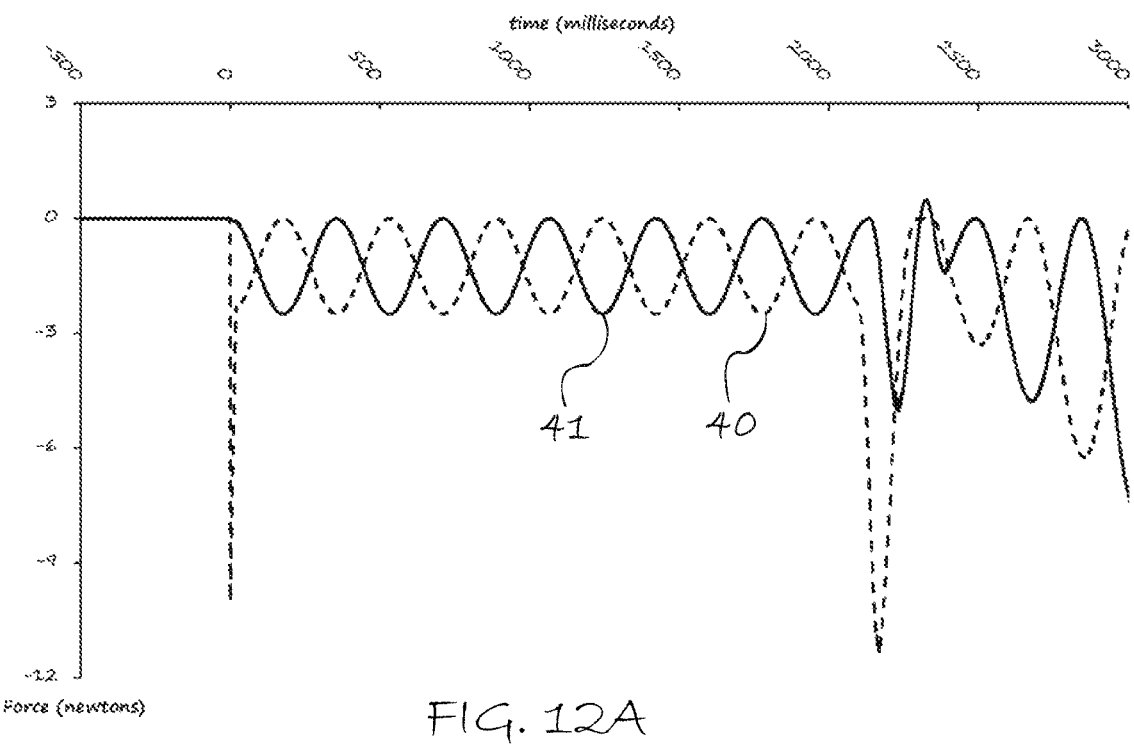
FIG. 12A is a time-based graph corresponding to FIGS. 11A through 11D and FIG. 12B illustrating the force output of phase A (solid line, left y-axis) and phase B (dashed line, right y-axis) of an LEM—according to an embodiment.
Figure 12B:
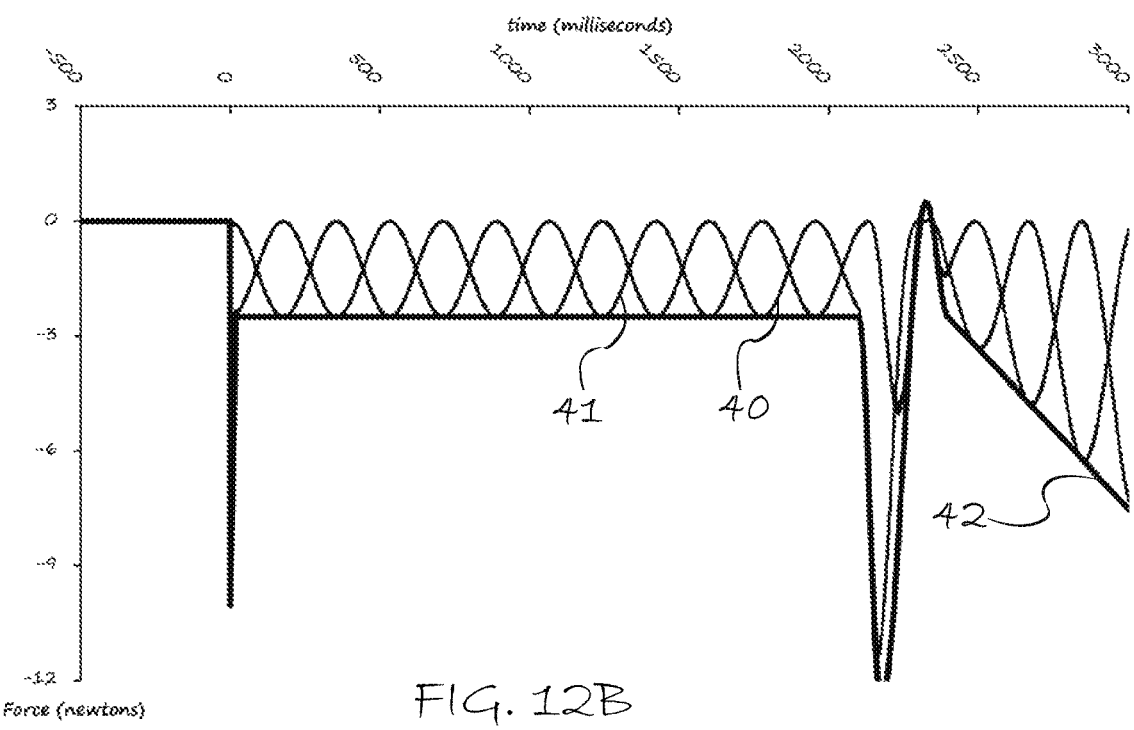
FIG. 12B is a time-based graph corresponding to FIG. 11A through 11D and FIG. 12A, illustrating the force output of both phases, and the sum of those force output (i.e. the force output of the LEM)—according to an embodiment.

Due to the simplicity of materials and the relative ease of construction when compared to existing technologies, as well as the performance resulting from the speed and lack of friction characteristic of magnetic fields, embodiments described herein are well suited to force-feedback devices such as simulation controls, remote controls, and gaming controls. FIGS. 11A through 11D and FIGS. 12A and 12B can be used to illustrate typical operation of a two-phase embodiment being attached to a linear throttle control. The throttle is intended to exhibit damping throughout its travel, to exhibit stiction when the speed is zero, to exhibit a "detent" centered at seventy-five percent of its maximum travel, and to exhibit a spring force beyond eighty-percent of its maximum travel. FIGS. 11A through 11D are aligned according to the time axis and represent a user pushing the throttle from zero-percent to one-hundred-percent in one smooth motion over three seconds. FIG. 11A represents the shaft's position at any point in time, and its straight line indicates a constant movement, despite the forces being output from the embodiment (this unrealistic scenario is used to simplify illustration). FIG. 11B represents the force commanded of the embodiment—typically from a system connected to both the embodiment and whatever the throttle is controlling. A stiction force can be seen resisting the motion at time zero. While the shaft is in constant motion from time zero to three-seconds, there is constant negative damping force. After 2 seconds, there is a "detent" force, after which a spring force increases as the shaft position moves away from eighty-percent. FIG. 11C represents the current provided to one of two phases in the embodiment (solid line), while the phase response function for that phase is overlaid for illustration (dashed line), and FIG. 11D represents the current provided to the other phase (solid line) and the phase response function of that phase (dashed line); these currents are typically controlled via h-bridges by using current sensors and closed-loop control; often it is advantageous to include a microcontroller within the embodiment that can be configured to receive current sense information and perform close-loop current control via the h-bridges to realize the phase currents that are calculated via the commutation functions. It is understood that the solid lines in FIGS. 11C and 11D are the result of real-time control of the current within the phases, while the dashed lines are the result of the static relationships between the shaft and phases in this particular embodiment; it is further understood that the dashed lines were determined during design or during a profiling step and were then used to determine the commutation functions that, when combined with the commanded force and the phase position, were used to determine the required (and thus realized) currents in the phases (solid lines). The current applied to the two phases results in a force generated between the shaft and the phases; FIG. 12A illustrates the force output of phase A (curve 41) and the force output of phase B (curve 40); FIG. 12B further illustrates these functions of force output versus time, while also including their sum: the force output of the embodiment (curve 42). The force curves, 41 and 40, follow from the current curves (solid lines) of FIGS. 11C and 11D respectively, multiplied by the respective phase response curves (dashed lines).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Furthermore, one or more components of a described apparatus or system may have been omitted from the description for clarity or another reason. Moreover, one or more components of a described apparatus or system that have been included in the description may be omitted from the apparatus or system.

What is claimed is:

1. A linear electric machine, comprising:
   one or more shafts including one or more magnets configured to produce a sinusoid-like magnetic-field pattern;
   one or more winding packs, each defining a central bore and a central axis; each winding pack being configured to receive one of the one or more shafts along a central axis and within the defined central bore,
   each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three;
   a phase-position sensor configured to detect the alignment of the shaft magnetic field with respect to at least one phase; and
   spacers, each disposed between a respective pair of windings,
   wherein the spacers contain features for mounting electronic components.

2. The linear electric machine of claim 1, wherein the shaft contains a magnetic material in between the magnets.

3. The linear electric machine of claim 1, wherein the shaft magnets are spaced by non-magnetic material.

4. The linear electric machine of claim 1, wherein the spacers contain features for routing the leads from the windings.

5. A linear electric machine, comprising:
   one or more shafts including one or more magnets configured to produce a sinusoid-like magnetic-field pattern;
   one or more winding packs, each defining a central bore and a central axis; each winding pack being configured to receive one of the one or more shafts along a central axis and within the defined central bore,
   each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three;

a phase-position sensor configured to detect the alignment of the shaft magnetic field with respect to at least one phase; and
spacers, each disposed between a respective pair of windings,
wherein the spacers each include a respective printed-circuit assembly.

6. The linear electric machine of claim 1, further comprising h-bridge circuits each configured to power a respective one of the phases selectively.

7. The linear electric machine of claim 1, further comprising a microcomputer coupled to the phase-position sensor, including a memory storing at least one communication function, and configured to realize a force command by selectively powering the phases in response to at least one of the at least one communication function and an output signal of the phase-position sensor.

8. A linear electric machine, comprising:
one or more shafts including one or more magnets configured to produce a sinusoid-like magnetic-field pattern;
one or more winding packs, each defining a central bore and a central axis; each winding pack being configured to receive one of the one or more shafts along a central axis and within the defined central bore,
each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three;
a phase-position sensor configured to detect the alignment of the shaft magnetic field with respect to at least one phase; and
a microcomputer coupled to the phase-position sensor, including a memory storing at least one communication function, and configured to realize a force command by selectively powering the phases in response to at least one of the at least one communication function and an output signal of the phase-position sensor,
wherein the microcomputer memory also stores one or more response functions, and where the microcomputer is configured to translate measured currents within the phases into corresponding forces, and to determine the amount of force generated between the at least one shaft and the at least one winding pack.

9. A linear electric machine, comprising:
one or more shafts including one or more magnets configured to produce a sinusoid-like magnetic-field pattern;
one or more winding packs, each defining a central bore and a central axis; each winding pack being configured to receive one of the one or more shafts along a central axis and within the defined central bore,
each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three; and
a phase-position sensor configured to detect the alignment of the shaft magnetic field with respect to at least one phase,
wherein the magnetic fields of the shaft are such that the characteristic response function of the LEM, when normalized according to a maximum magnitude thereof, and when scaled and translated along an x-axis such that it shares zero-crossings and polarity with a sin-function, falls within ten-percent of the sin-function's value for all phase angles.

10. A system comprising:
one or more components; and
a linear electric machine, including:
one or more shafts each including one or more magnets configured to produce a sinusoid-like magnetic-field pattern, at least one of the one or more shafts coupled to at least one of the one or more components;
one or more winding packs, each defining a central bore and a central axis; each winding pack being configured to receive one of the one or more shafts along a central axis and within the defined central bore;
each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three; and
a phase-position sensor configured to detect the alignment of the shaft magnetic field with respect to at least one phase,
wherein at least one of the one or more components is a manipulator configured to be manipulated by a human.

11. The system of claim 10 wherein at least one of the one or more components is a mechanical ground.

12. A system comprising:
one or more components; and
a linear electric machine, including:
one or more shafts each including one or more magnets configured to produce a sinusoid-like magnetic-field pattern, at least one of the one or more shafts coupled to at least one of the one or more components;
one or more winding packs, each defining a central bore and a central axis; each winding pack being configured to receive one of the one or more shafts along a central axis and within the defined central bore;
each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three; and
a phase-position sensor configured to detect the alignment of the shaft magnetic field with respect to at least one phase,
wherein:
at least one of the one or more components is a remotely-located machine; and
the position of at least one of the one or more shafts included in the LEM is used to manipulate the state of the remotely-located machine.

13. A system comprising:
one or more components; and
a linear electric machine, including:
one or more shafts each including one or more magnets configured to produce a sinusoid-like magnetic-field pattern, at least one of the one or more shafts coupled to at least one of the one or more components;
one or more winding packs, each defining a central bore and a central axis; each winding pack being configured to receive one of the one or more shafts along a central axis and within the defined central bore;
each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three; and
a phase-position sensor configured to detect the alignment of the shaft magnetic field with respect to at least one phase, wherein:
at least one of the one or more components is a remotely-located machine; and
the force output of the LEM is used to impart information relating to the state of the remotely-located machine.

14. A system comprising:
one or more components; and
a linear electric machine, including:
one or more shafts each including one or more magnets configured to produce a sinusoid-like magnetic-field pattern, at least one of the one or more shafts coupled to at least one of the one or more components;
one or more winding packs, each defining a central bore and a central axis; each winding pack being configured to receive one of the one or more shafts along a central axis and within the defined central bore;
each winding pack including two or more phases of windings being distributed along a shared central axis, each phase spaced apart from an adjacent phase by an approximately same interval, a product of said interval multiplied by a number of said phases equal to an integer multiple of one-half a period of the sinusoid-like magnetic-field pattern, the number of phases being more than three; and
a phase-position sensor configured to detect the alignment of the shaft magnetic field with respect to at least one phase, wherein:
at least one of the one or more components is an electronic circuit configured to simulate a connection to a machine; and
the force output of the LEM is used to impart information relating to the state of the simulated connection.

* * * * *